US012749084B2

(12) United States Patent
Dai Zovi et al.

(10) Patent No.: US 12,749,084 B2

(45) Date of Patent: Sep. 29, 2026

(54) LOGICAL VALIDATION OF DEVICES AGAINST FRAUD AND TAMPERING

(71) Applicant: Block, Inc., Oakland, CA (US)

(72) Inventors: Dino Dai Zovi, Brooklyn, NY (US); Janek Klawe, New York, NY (US)

(73) Assignee: Block, Inc., Oakland, CA (US)

(*) Notice: Subject to any disclaimer, the term of this patent is extended or adjusted under 35 U.S.C. 154(b) by 0 days.

(21) Appl. No.: 19/244,581

(22) Filed: Jun. 20, 2025

(65) Prior Publication Data

US 2025/0315845 A1 Oct. 9, 2025

Related U.S. Application Data

(63) Continuation of application No. 18/754,056, filed on Jun. 25, 2024, now Pat. No. 12,367,501, which is a continuation of application No. 18/136,870, filed on Apr. 19, 2023, now Pat. No. 12,067,582, which is a continuation of application No. 17/850,683, filed on (Continued)

(51) Int. Cl.

| | |
|---|---|
| ***G06Q 30/00*** | (2023.01) |
| ***G06Q 20/02*** | (2012.01) |
| ***G06Q 20/04*** | (2012.01) |
| ***G06Q 20/34*** | (2012.01) |
| ***G06Q 20/38*** | (2012.01) |
| ***G06Q 20/40*** | (2012.01) |
| ***G06Q 30/018*** | (2023.01) |
| ***G07F 7/08*** | (2006.01) |
| ***G07G 1/00*** | (2006.01) |

(52) U.S. Cl.

CPC ......... *G06Q 30/0185* (2013.01); *G06Q 20/02* (2013.01); *G06Q 20/0457* (2013.01); *G06Q 20/3567* (2013.01); *G06Q 20/38215* (2013.01); *G06Q 20/3823* (2013.01); *G06Q 20/3825* (2013.01); *G06Q 20/3829* (2013.01); *G06Q 20/4016* (2013.01); *G07F 7/0873* (2013.01); *G07G 1/0009* (2013.01)

(58) Field of Classification Search

CPC ............. G06Q 20/401; G06Q 20/4016; G06Q 30/0185; G06Q 20/02; G06Q 20/0457

USPC .......................................................... 235/380

See application file for complete search history.

(56) References Cited

U.S. PATENT DOCUMENTS

2011/0078034 A1* 3/2011 Hayhow ............ G06Q 30/0185 705/21

2011/0078791 A1* 3/2011 Prakash ................ G06F 21/565 726/22

(Continued)

*Primary Examiner* — Paultep Savusdiphol

(74) *Attorney, Agent, or Firm* — Lee & Hayes, P.C.

(57) ABSTRACT

Systems and methods directed to a payment server updating an attestation routine. A payment server can receive, from a merchant's payment terminal, attestation data based on execution of the attestation routine comprising test criteria. The payment server can determine a first indication of fraud associated with a payment transaction conducted at the payment terminal or a first indication of a tamper attempt associated with the payment transaction based at least in part on the attestation data and payment transaction data. The payment server can then receive a second indication that indicates improper denial or improper acceptance of the payment transaction. Based at least in part on the indications, the test criteria is updated and an updated attestation routine comprising the updated test criteria is generated.

20 Claims, 13 Drawing Sheets

Related U.S. Application Data

Jun. 27, 2022, now Pat. No. 11,663,612, which is a continuation of application No. 16/773,892, filed on Jan. 27, 2020, now Pat. No. 11,373,194, which is a continuation of application No. 15/199,933, filed on Jun. 30, 2016, now Pat. No. 10,546,302.

(56) References Cited

U.S. PATENT DOCUMENTS

| | | | | |
|---|---|---|---|---|
| 2012/0084203 | A1* | 4/2012 | Mehew | G06Q 20/40<br>705/41 |
| 2012/0167162 | A1* | 6/2012 | Raleigh | H04M 15/00<br>726/1 |
| 2013/0111591 | A1* | 5/2013 | Topan | H04L 63/14<br>726/24 |

* cited by examiner

LOGICAL VALIDATION OF DEVICES AGAINST FRAUD AND TAMPERING

PRIORITY

This application is a continuation of, and claims priority to U.S. patent application Ser. No. 18/754,056, filed on Jun. 25, 2024, which is a continuation of U.S. patent application Ser. No. 18/136,870, filed on Apr. 19, 2023, and issued as U.S. Pat. No. 12,067,582 on Aug. 20, 2024, which claims priority to U.S. patent application Ser. No. 17/850,683, filed on Jun. 27, 2022, and issued as U.S. Pat. No. 11,663,612 on May 30, 2023, which claims priority to U.S. patent application Ser. No. 16/773,892, filed on Jan. 27, 2020, and issued as U.S. Pat. No. 11,373,194 on Jun. 28, 2022, which claims priority to U.S. patent application Ser. No. 15/199,933, filed on Jun. 30, 2016, and issued as U.S. Pat. No. 10,546,302 on Jan. 28, 2020, each of which is fully incorporated by reference herein.

TECHNICAL FIELD

Electronic payments may be performed in a variety of ways. A payment terminal may process payment transactions, and may interact with payment devices such as a payment card having a magnetic strip that is swiped in a magnetic reader of the payment terminal, a payment device having a Europay/Mastercard/Visa (EMV) chip that is dipped into corresponding EMV slot of the payment terminal, and near field communication (NFC) enabled devices such as a smartphone or EMV card that is tapped at the payment terminal and transmits payment information over a secure wireless connection. The payment terminal may receive payment information from the payment device as well information about a transaction, and may communicate this information to a payment system for processing of the transaction.

As a result of its central role in the transaction processing system, the payment terminal is a prime target for third party attackers attempting to access payment information, process fraudulent transactions, and otherwise engage in fraudulent activities or theft. In many cases, the attackers attempt to physically access components of the payment terminal, such as one or more communication lines carrying data or a processor that communicates and processes payment information.

Attackers may attempt to eavesdrop on signals (e.g., a passive attack) or to modify or spoof payment processing communications (e.g., an active attack) by injecting malicious signals into the payment terminal. A payment terminal may attempt to identify fraudulent transactions and tamper attempts. However, as attackers become more sophisticated, measures such as tamper switches or tamper meshes may be bypassed, or attacks may be performed without gaining physical access to any components of the payment terminal. For example, some attackers may create counterfeit or modified payment cards (e.g., EMV cards), or may construct tamper devices that intercept, forward, or modify signals transmitted between a payment terminal and a payment device. Moreover, a payment terminal may also lack information about other payment transactions that are occurring, and thus, other attempts to engage in fraudulent transactions or to tamper with a payment object reader.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1A:
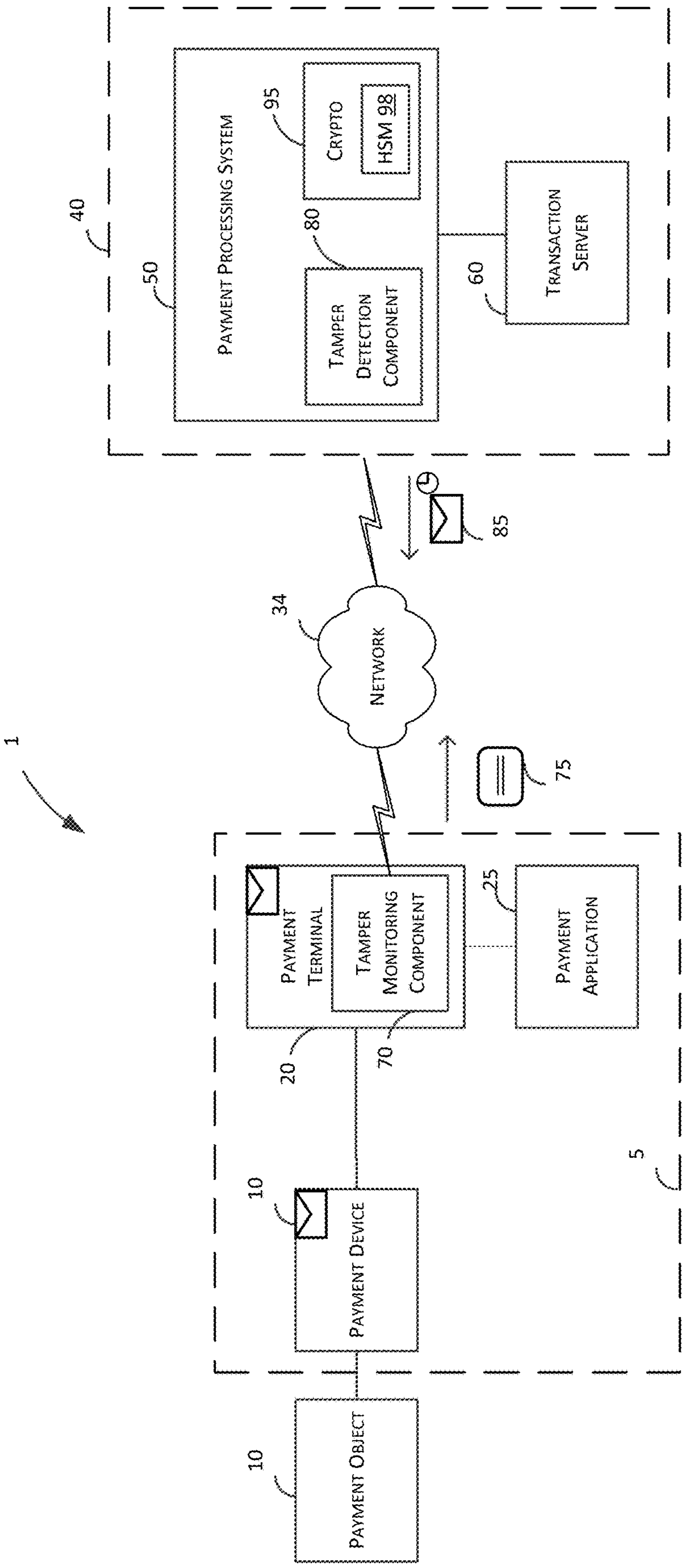
FIG. 1A shows an illustrative block diagram of a payment system in accordance with some embodiments of the present disclosure.

Some implementations described herein include methods and systems that enable a payment service to attest a payment device, such as a payment terminal and then validate a session between the payment device and another device, such as a payment object reader. The attestation and validation together indicate that the device is determined to be secure for all communication, such as exchange of financial information.

Generally, computer platforms used for commercial applications typically operate in an environment where their behavior is vulnerable to modification by local or remote entities. For example, a point-of-sale (POS) terminal belonging to one party may be receiving data from a second party through a mobile application belonging to a third party installed on the POS terminal. In one instance, a payment transaction involves a buyer providing a payment card, such as a credit card or debit card, to pay for a product or service that the buyer purchases from a merchant. The credit card is swiped or dipped into a card reader, which is connected to or included within a point-of-sale (POS) terminal executing a payment application to allow a merchant to display available items, take orders, obtain electronic signatures from the buyer, and so on. The POS terminal generates a payment request in response to the swiping action and based on the data collected from the credit card. The POS terminal electronically sends the payment request to a payment card processor over an available network for authorization.

Where a number of separate applications and processes are running simultaneously on a computer platform, the applications are not necessarily isolated or protected from one another. The volume of source code for the software components involved is typically so large in modern operating systems that it is virtually impossible to ensure the correctness of the source code and whether the behavior of the source code will behave as expected. The payment card has sensitive financial information and the customer is not privy to the security features on the POS terminal or the card reader, it is critical that features of the POS terminal, the payment application, and the card reader (collectively referred to as payment entity) are un-tampered, un-modified, and secure and remain so before, during or after processing of a payment transaction.

To alleviate at least the problems mentioned above, the embodiments herein disclose methods and systems where the payment entity or payment platform supporting the payment entities and the mobile payment application is deemed secure either through tamper detection or attestation or both, as described hereinafter. The embodiments generally provide the incorporation of an augmented tamper and fraud detection methodology (i.e., trust routine) into a computing platform of a payment entity based on one or more trust commands initiated by a server. The trust commands include varying levels of specificity and granularity including, but not limited to, hashing a portion of a software code, scanning memory of the payment entity, checking for jailbreaking of the software code, gathering metadata of a mounted file system, and so on) based on reliably measured data or test criteria collected over a population of payment platforms or pre-set values determined by security experts. After incorporation of the trust routine, a payment processing system (PPS) assigns the payment platform as trusted for a predetermined period of time and assigns an attestation ticket for all future interactions. At the lapse of the time period, the attestation routine can be re-initialized and re-executed to attest the payment platform for the second time.

The function of such attestation and tagging the payment platform as a trusted device is to bind the identity of the platform, including the device, application, and associated software operating environment, to reliably measured data that provides an integrity metric of the payment platform. The identities and the integrity metrics may be compared with expected values provided by a trusted party (TP) that is prepared to vouch for the trustworthiness of the platform. Optionally, the expected values provided by the trusted third party are securely stored in the respective physical trusted device and the PPS. If there is a match, the implication is that at least part of the platform and operating system is operating correctly, depending on the scope of the integrity metric. Additionally, the PPS generates an attestation ticket and assigns to the platform for future transactions or until a fraud event threatens the credibility of the payment platform. At that time, the PPS stalls all processing and functionalities of the payment platform until it re-attests the platform.

In case of a payment transaction on the payment entity, the PPS verifies the correct operation of the platform and operating environment through status of the attestation ticket before exchanging data with the platform. The PPS does this by requesting the identities and integrity metrics of the physical trusted platform and the virtual trusted device. (Optionally the trusted devices will refuse to provide evidence of identity if it itself was unable to verify correct operation of the platform.) The PPS receives the proof of identity and the identity metric, and compares them against the values provided by the trusted third party. If the measured data reported by the trusted devices are the same as that provided by the trusted third party, the PPS can trust the platform.

Furthermore, the ticket is saved in the POS terminal for any interaction between the reader and the POS terminal and all transactions are attached with the attestation ticket to prove the session is secure.

Additionally, where the computer platform is arranged to support a plurality of separate merchant accounts (e.g., there may be several applications associated with the PPS-a peer-to-peer money transfer service and a transaction processing application), each account having their own attestation tickets, as such the operating environment of one application is isolated from any other operating environment running on the same computer platform.

Once the PPS has established trusted operation of the platform and operating environment, a user of the platform is able to exchange data, including sensitive financial data, with other aspects of the platform and the PPS. For a local system, the exchange accompanying a valid (i.e. not expired) attestation ticket might be by interacting with some software application running within the operating environment on the platform. For a remote system such as the PPS, the exchange accompanying a valid attestation ticket might involve completion of a secure transaction. In either case, the data exchanged is typically 'signed' by one of the trusted devices or platforms. The PPS can then have greater confidence that data is being exchanged with a platform whose behavior can be trusted. The attestation ticket can also indicate the time for which the platform can be trusted.

In one implementation, the trusted platforms use cryptographic processes but do not necessarily provide an external interface to those cryptographic processes. In first embodiments, to ensure there is a minimum risk that the PPS is susceptible to software attack by rogue software running on the computer platform the PPS is arranged to be executed in a processor privilege level that restricts access to other software applications being executed on the computer platform (as described below). Additionally, highly sensitive data within the PPS is stored such that the data is inaccessible to software applications being executed in a processor privilege level that is lower than that in which the PPS is executed. Also, a most desirable implementation would be to make the payment platform tamperproof, to protect data by making them inaccessible to other platform functions and provide an environment that is substantially immune to unauthorized modification. Since tamper-proofing is impossible, the best approximation is a trusted device that is tamper-resistant, or tamper-detecting. The trusted device, therefore, preferably consists of one physical component that is tamper-resistant. Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected.

As mentioned before, the PPS generates an attestation routine having trust commands to determine whether a platform can be trusted and generate an attestation ticket for the platform if it can, on receiving commands from the PPS.

The trust commands trigger monitoring components, such as tampering/fraud detection component within the PPS and a companion component, within the payment platform, such as a tampering/fraud reporting component, that measure electrical characteristics of various components of the payment application, POS terminal, payment object reader, such as the payment interfaces that interact with the various types of payment devices and test operation of software components. Using these monitoring components, the platform is able to monitor values such as current, voltage, impedance, and capacitance, to determine whether a component is acting in an abnormal manner. The monitoring components may also send test requests, for example, on an input/output line of the interface with an EMV card. Monitoring components may then measure electrical characteristics of the test signal, which may be indicative of a counterfeit card or a tamper device on the input/output line. The monitoring components may also send test request messages, in order to test whether the payment platform responds in an expected manner.

The monitoring component may utilize information such as the monitored electrical characteristics and the responses from the payment platform to determine whether a fraudulent transaction or tamper attempt is occurring or has recently occurred, based on a comparison with reliably measured data or test criteria collected over a population of payment platforms. In some cases, and depending on the type of fraudulent transaction or tamper attempt, the PPS may take corrective action such as aborting a payment transaction, temporarily disabling components of the payment object reader, or permanently disabling components of the PPS.

In some cases, such actions may be performed by a reader or the payment application. In such cases, the payment object reader may also communicate with a payment processing system (for example, through the merchant device and a communications network). In addition to sending payment transaction information to the payment processing system, the payment object reader may also send the monitored electrical characteristics and the response messages to the payment processing system. The payment processing system may utilize this information to determine whether a fraudulent transaction or tamper attempt has occurred, based on a comparison with integrity metrics. The payment processing system may also store this information in a transaction database. Information in the transaction database may also be used to determine whether a fraudulent transaction or a tamper attempt has occurred, for example, based on similar previous transactions.

The payment processing system may also update the test criteria used by both the payment object reader and the payment processing system for future transactions and attestations of this platform and other platforms. As more information about fraudulent transactions and tamper attempts is collected at the transaction database, this information may be used to generate the new test criteria. In addition, the payment processing system may receive feedback from other systems, such as whether the payment transaction was improperly denied (a false positive) or improperly accepted (a false negative). This information may also be used to update the test criteria. The updated test criteria for the payment platform may be transmitted to the monitoring components which may update its local test criteria based on the updated test criteria. In some implementations, the attestation occurs periodically or at random time intervals and the attestation ticket is valid until it expires. In some implementations, the validity of the attestation ticket can be invalidated and/or re-generated when an attestation trigger occurs. Examples of attestation trigger includes, but are not limited to, pairing a new reader to the POS terminal, installing a payment application to an unknown device, detecting re-location of the reader or the POS terminal to a new location, for example known to be fraudulent, detecting insertion of a card from a fraudulent user, detecting a fraudulent card, detecting entry of a fraudulent device within an established geo-fence, and so on. As such, the attestation ticket can attest not just the platform but also the environment, such as the location where the merchant store is, the customers or payment objects or payment devices (such as Apple Watch®) that enter a geo-fence.

In some implementations, the PPS has implemented within failover technology. A first component provides public endpoints to interact with the payment terminal to receive ticket requests, create and validate tickets attesting that a device has been scanned by payment platform without problems. The work of directing and evaluating the scans, however, for tamper detection and other kind of security analysis is forwarded to another component. If the second component fails, the first component, which is also client-facing, can "fail open" by pretending that the second component approves all devices. This means there can be some periods where the security is disabled; however, these periods are conspicuous and not under an attacker's control or view. Further, during the "down time," the requests may be batched and reviewed when the second component comes back up.

As described above, the disclosed technology enables generation of an attestation ticket object when the platform is scanned for the first time or every time it is, which indicates that the payment platform was scanned, result of the scan in an authenticated and encrypted manner, and further indicates that no security threats were detected that would otherwise prevent the operation of the payment platform. Further, the attestation ticket has associated with it a timestamp when the scan was performed and an expiration date or lifetime, say 15 minutes. The assignment of such ticket to a platform, such as a payment device, payment terminal, payment application, and any other third-party system) for a defined or an undefined period time with or without any conditions allows an unrestricted operation of the payment platform, that is without requiring a security check every time an event occurs, such as a transaction is processed. So, anytime the payment platform performs an action, it sends to the PPS the attestation ticket to prove that it is trusted and secure. The PPS then based on the logic residing in the tamper and fraud detection component allows or rejects the action and otherwise provide access. Because the attestation ticket does not have to be generated every single time the payment platform interacts with the PPS, it allows for quick and synchronous judgment of whether or not to allow transaction without any delays involved with scanning, etc.

In some implementations, the attestation ticket is generated regardless of whether the scan indicates problems with the platform or not, but includes information indicating the problems. When the PPS analyzes the ticket, it determines that the session is not secure and then rejects the transaction. This is useful if a fraud user of the payment platform, such as third-party application, discovers a way to save the attestation ticket and use for other platforms that have been determined to be fraudulent at an earlier time. The ticket may include information related to the device or platform that has been authorized of trusted such that any copying would either destroy the ticket or cause the ticket to be unusable for any other device or purpose. As hinted previously, the attestation ticket can be associated with conditions to indicate that the ticket can only be used for certain devices, version of software, or in an online/offline mode, and so on.

Certain readers operating on certain protocols, like EMV protocol, incorporate the attestation ticket to allow implementation of software PIN functionality instead of hardware PIN, for example. The PPS can perform both reader-terminal secure session validation, which is easy to implemented, impossible to reverse-engineer since tickets are opaque to the client devices, has a fail-over implementation, and supports all kinds of merchants. The PPS can also perform tamper detection and fixes, for example by disabling or degrading performance for a short-time without severe consequences. In some implementations, the attestation process is separate from the tamper detection and is carried out by separate components in isolation.

Advantages of the disclosed methods and systems help: prevent casual attacks, obvious non-obfuscated protections, detect when casual attack defenses have been intentionally bypassed, and bypassing/disabling non-obfuscated protections is a strong signal; impede attack discovery and initial exploitation, implement software anti-tamper techniques for tamper resistance, tamper detection, tamper response, and tamper evidence; adapt/dynamism to shake off deployed attacks and raise development costs; rotate/reserve of multiple "equivalent" obscure detection; respond to attacks, and so on. The other advantages in some implementations include separating process of attestation from the process of establishing secure sessions and by that, the system can avoid expensive, last-minute computations. Also, by splitting process with different service level agreements (SLAs), the failover system can be established to prioritize high SLA process (e.g., generating attestation tickets) over lower SLA process (e.g., tamper detection).

While the embodiments described herein may relate to brick-and-mortar retails stores using POS terminals, including self-checkout terminals, it will be understood that the embodiments can be extended to shopping at any e-commerce location, including online shopping via merchant websites or applications.

Various embodiments and implementations of the disclosed tamper and fraud detection technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by buyers. Actions attributed to a merchant may include actions performed by owners, employees, or other agents of the merchant and thus no distinction is made herein unless specifically discussed. In addition, as used herein, a buyer may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires an item from a merchant, and in return, the buyer provides payment to the merchant, for example through a biometric payment instrument.

As used herein, a 'payment transaction' or simply 'transaction' may include a financial transaction for the acquisition of goods and/or services that is conducted between a buyer and a merchant. For example, when paying for a transaction, the buyer can provide the amount that is due to the merchant using a payment proxy. In other cases, the payment transaction includes transfer of money from one party to another for any number of reasons. Thus, while the description refers to as buyer and merchant as parties to the payment transaction, it will be understood that the parties can be a sender and a recipient, a land lord and a renter, a bank and a bank customer, a first friend and a second friend, and so on.

The term 'payment card' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or merchant's financial account. The payment proxy can be used in the context of and within a webpage as part of the web address, a social networking handle or username, a forum, a messaging application, and so on.

The term 'biometric payment instrument' is a type of payment object or financial instrument that is biometrically identifiable and initialized by a biometric characteristic, such as a person's finger (e.g., for fingerprint recognition), face, iris or retina, heartbeat, voice, etc.

The payment object reader may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment object. Accordingly, the payment object reader may include hardware implementation, such as slots, magnetic tracks, and rails with one or more sensors or electrical contacts to facilitate detection and acceptance of a payment object. Additionally or optionally, the payment object reader may also include a biometric sensor to receive and process biometric characteristics and process them as payment instruments, given that such biometric characteristics are registered with the payment processing system and connected to a financial account.

In one example, the POS terminal can be a hand-held device such as a mobile phone, laptop, tablet computer, and the like, associated with a merchant. In another example, the POS terminal is a mobile device that is wearable or otherwise connected to or associated with the buyer or merchant, for example, the computing device may be an Apple® watch or a Fitbit®.

The term "attest security" or "attestation of a device" is intended to mean methods to determine whether a hardware or software has been modified from its original or factory configuration. For example, systems can identify unauthorized changes to software, including users tampering with their software to circumvent technological protection measures. It works by having the hardware generate a certificate stating what software is currently running. The computer can then present this certificate to a remote party to show that unaltered software is currently executing.

As used here, the term "pairing" or "associating" refers to a process in which the POS terminal and the payment object reader establish a communication channel with each other using wireless communication protocols, for example, Bluetooth®, Bluetooth Low Energy®, Wi-Fi®, etc. The POS terminal and the payment object reader each includes a transceiver capable of transmitting data between them once "paired." The pairing technology described herein can pair a payment object reader to the POS terminal in both real-time and offline modes. Furthermore, even though Bluetooth or Bluetooth Low Energy has been used to describe certain embodiments, other wireless protocols, such as NFC, Wi-Fi, etc., can also be used.

The term "landing page," as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender.

The term "registration application" or "mobile payment portal" as used here, refers to any messaging application that enables communication between users (e.g., sender and recipient of a message) over a wired or wireless communications network. A service provider that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the user has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment processing system for processing. The payment processing system identifies a recipient associated with the input (or payment proxy) that is derived from the TO field, and further identifies a recipient financial account associated with that recipient. Upon identification of the recipient financial account, the payment processing system initiates the transfer of money.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "swipe" here refers to any manner of triggering a payment object reader to read data from a payment object, such as by dipping into, tapping, hovering, bringing in close contact or passing the payment object into or through a payment object reader.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

While certain devices, e.g., the payment object readers and POS terminals are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

It is noted that the payment proxy technology is equally applicable in other embodiments to various other content providers and various other types of providers, such as financial service providers or to any application that involves communication of messages between users, and that the payment proxy technology is not limited to media channels and/or messaging applications.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the Figures, FIG. 1A depicts an illustrative block diagram of a network environment 1 in accordance with some embodiments of the present subject matter. In one embodiment, network environment 1 includes a payment object 10, payment terminal 20, network 30, and payment server 40. In an exemplary embodiment, payment server 40 may include a plurality of servers operated by different entities, such as a payment processing system 50 (also referred to as PPS 50) and a transaction server 60, such as an acquirer, issuer, card processing network or all. PPS 50 can include additional components, such as the tamper detection component 80 and crypto 95. Crypto 95 can further include or is associated with hardware security module (HSM) 98. These components of network environment 1 facilitate electronic payment transactions between a merchant and a customer in a secure and fast manner using attestation schemes synchronous to the payment transaction.

The electronic interactions between the merchant and the customer take place between the customer's payment object 10 and the merchant's payment terminal 20 (including the payment object reader 3). The customer has a payment object 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application. The merchant inserts the payment object 10 in the payment object reader 3 which is paired or otherwise connected to the payment terminal 20. The process of pairing is not described and will be understood to a person skilled in the art.

In some embodiments (e.g., for low-value transactions or for payment transactions that are less than a payment limit indicated by a NFC or EMV payment object 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment processing system 50 and one or more banks of the merchant and customer (e.g., a transaction server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

In some embodiments, payment terminal 20 may perform physical and logical scans or tests to collect information that is useful in determining whether or not a transaction is fraudulent or whether an attacker is attempting to tamper with the payment terminal 20. The payment terminal 20 may take corrective action (e.g., aborting a transaction or disabling one or more components of the payment terminal 20) based on a comparison of the collected information to one or more test criteria or commands. In some embodiments, the information may be transmitted to the payment server 40 (e.g., payment processing system 50) for processing. Payment server 40 may determine whether to take corrective action based on the received information as well as information from previous transactions and other ongoing transactions. Payment server 40 may provide a fraud determination message to the payment terminal 20, which may cause the payment terminal 20 to take corrective action. In some embodiments, payment server 40 may also generate updated test criteria for payment terminal 20 and provide the update for to payment terminal 20 for use in processing of future transactions.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In one implementation, the payment system 1 discloses methods and system to generate an attestation ticket 85 to indicate to any other entity that the payment terminal 20, the payment object reader 3, the payment application 25 (together referred to as payment platform 5) is secure and trusted and thus, any requests originating from the platform 5 is also secure. For example, if the payment platform is configured to receive software PINs, the platform can do so as long as it is attested. If the payment platform is not attested, for example, if the payment terminal is not attested, the reader 3 does not communicate with the payment terminal 20 or the payment application 25 until the payment processing system 50 has validated the payment terminal 20. Software PIN is just one of the many reasons why validation is performed, as will be understood by a person skilled in the art.

Operationally, a tamper detection component 80 is included within the payment processing system 50, and is configured to send attestation routines, specifying various scans and tests that it would like a client component, i.e., tamper monitoring component 70, to perform on the client device, i.e., the payment platform 5. For example, the attestation routine can include test criteria or commands instructing the tamper monitoring component 70 to: measure electrical characteristics of various components of the payment application, POS terminal, payment object reader, such as the payment interfaces that interact with the various types of payment devices and test operation of software components; monitor values such as current, voltage, impedance, and capacitance, to determine whether a component is acting in an abnormal manner; measure platform characteristics such as manufacturing or engineering tolerances, timing parameters, associated behaviors; check activation of certain communication ports; measurement of the phase error, of the frequency error, of the power and of the spectrum, power signal levels such as RSSI levels, RSSI vs. frequency measurements; measure engineering tolerances, hardware imperfections inherent to analog components of the device, radio frequency response to certain signals; measure physical, mechanical, magnetic, electro-mechanical, or operational characteristics; compare platform characteristics with the population of all other platforms or platforms within a geographical area; and so on.

In one implementation, the payment platform 5 (or one of the entities within such as the payment terminal 20) requests for an attestation ticket from the payment service system 50. For example, the tamper monitoring component 70 first requests the tamper detection component 80 for an attestation ticket to attest the payment terminal 20 or a network device, such as a communication device or a payment application executing on the terminal and so on. This can happen periodically, randomly or after or before expiration of an attestation ticket. In other implementations, the attestation may be triggered by a physical event, such as the merchant connecting the reader 3 with the payment terminal 20 or the merchant installing a new payment application 25 on the payment terminal 20.

In response, the tamper detection component 80 generates an attestation routine with exemplary test criteria or commands mentioned above. On receiving the commands, the tamper monitoring component 70 scans the payment platform 5 or a portion thereof for modification, faults or anomalies in the payment platform 5, including the applications, hardware, and operating system. The payment processing system, executing the tamper detection component 80, not just specifies the checks the payment platform 5 executes, but also collects the resulting data from the tamper monitoring component 70, and then analyzes the data from the payment monitoring component 70 (hereinafter referred to as "attestation data 75") to identify suspicious activity. The tamper detection component 80 and the tamper monitoring component 70 can communicate via an obfuscated and encrypted protocol, hereinafter referred to as "trusted channel," for example, implemented on top of HTTP Secure (HTTPS).

In one implementation, the tamper detection component 80, on analysis of the attestation data 75, determines that the payment platform has no known issues and no security threats have been identified and generates an attestation ticket 85 and sends to the payment terminal 70 (or even the reader 3) for future transactions. Accordingly, the tamper detection component 80 can validate a secure session between the reader 3 and the payment terminal 20 or application 25 as long as the attestation ticket is valid. When the reader 3 is connected to the payment terminal 20, the reader 3 can communicate with the payment terminal 20 by presenting the ticket to the reader 3, and also to the payment processing system 50 when a transaction is being processed. In contrast, if the tamper detection component 80 has detected tampering or otherwise security issues on the payment platform 5, such as the payment terminal 20 of the merchant, the tamper detection component 50 does not generate an attestation ticket 85 or generates an attestation ticket 85 with an error code indicating that the tamper detection component 50 failed to validate the secure session. The reason the payment processing system 50 generates a ticket in both cases is so that a fraudulent user cannot differentiate one device from another based on lack of ticket, and reverse-engineer to fake attestation.

The tamper detection component 80 can assign a lifetime to the attestation ticket 85 and can send it to the device in the platform 5 that requested validation so that the platform is not scanned or tested every time a transaction occurs. When the ticket expires, the tamper monitoring component 70 re-submits request for an attestation ticket. In one implementation, the attestation ticket can also be invalidated and/or re-generated in response to other attestation triggers even though the attestation ticket is otherwise valid as per lifetime.

Examples of attestation trigger includes, but are not limited to, pairing a new reader, different from reader 3, to the payment terminal, installing a payment application to an unknown device, detecting re-location of the reader or the POS terminal to a new location, for example known to be fraudulent, detecting insertion of a card from a fraudulent user, detecting a fraudulent card, detecting entry of a fraudulent device within an established geo-fence, and so on. As such, the attestation ticket can attest not just the platform but also the environment, such as the location where the merchant store is, the customers or payment objects or payment devices (such as Apple Watch®) that enter a geo-fence.

When a transaction occurs between the payment terminal 20 and the payment object reader 3, the payment object reader 3 requests the payment terminal 20 to share the attestation ticket 85. The reader 3 decrypts or sends the attestation ticket 85 as-is to the server 50, which determines from the content and/or timing whether the attestation ticket 85 is valid during the secure session. If it is valid, the server sends the approval both or to the reader and the terminal. If not, the rejection is sent to the parties.

Figure 1B:
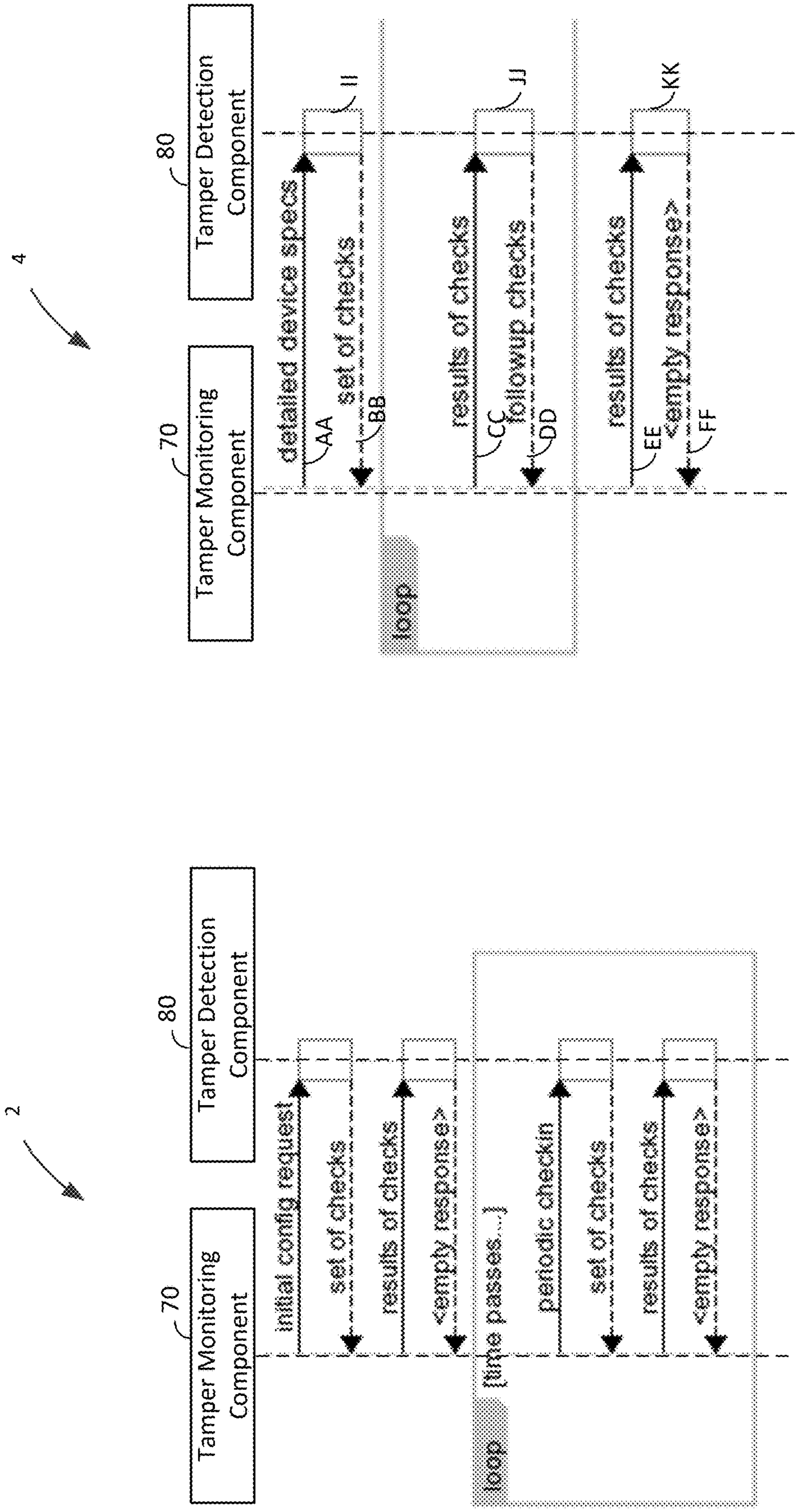
FIG. 1B shows an illustrative block diagram of a timing flow between a payment server and a payment terminal in accordance with some embodiments of the present disclosure.

FIG. 1B depicts illustrative method flows 2 and 4 between the tamper monitoring component 70 and the tamper detection component 80 in accordance with some embodiments of the present subject matter.

Referring to method flow 2, the tamper monitoring component 70 uses an HTTP endpoint to communicate with tamper detection component 80. Because it happens over HTTP, this is structured as a request from tamper monitoring component 70 followed by a response from tamper detection component 80. However, logically it can be more like a command from tamper detection component 80 followed by a result from tamper monitoring component 70. The tamper monitoring component 70 sends a request (a) on startup, (b) whenever it has data to send, and (c) every few minutes; this gives tamper detection component 80 regular opportunities to send new commands. As shown, at A, the tamper monitoring component 70 sends an initial request for configuration or attestation. At I, the tamper detection component 80 generates the routine. At B, tamper detection component 80 sends an attestation command or routine (say scan the entire device for a certain malware or jail-breaking sign) for tamper monitoring component 70 to execute. At C, the tamper monitoring component 70 generates results of the attestation command to tamper detection component 80, which are analyzed at J and Reponses, for example deny or approve the attestation or session validation can be sent using D to the tamper monitoring component 70. The process may be repeated several times or until a certain number of commands are executed or responses are obtained. The commands can be configured based on the requesting device, merchant, location and the like. Furthermore, the tamper monitoring component can check with the tamper detection component at predetermined time intervals to verify that the ticket or session certificate is valid. This is shown through the loop section of the figure. The server sends a command and generates a new command when the response to the first command is received. This messaging having multiple exchange protocol can be useful if the fraudster is trying to hack into the system and trying to determine a pattern. Thus, in one example, it can be a five-step decision tree with five cycles of information exchange. The responses to the commands can help filer a bad actor from a good actor. The same type of attestation ticket can be sent to both devices so that a fraudster cannot reverse-engineer. The tamper monitoring component and detection component 70 and 80 can also engage in periodic check-ins to either update the status of attestation ticket or to send state data for better analysis. Every "frame", or package of data from component 70, is saved to HDFS for future analysis. Particularly suspicious frames can be reviewed with immediate attention. Some devices that have generated more suspicious frames than a threshold level can be denied request for attestation.

In method flow 4, the tamper monitoring component 70 uses an HTTP endpoint to communicate with tamper detection component 80. Because it happens over HTTP, this is structured as a request from tamper monitoring component 70 followed by a response from tamper detection component 80. However, logically it can be more like a low-level command from tamper detection component 80 followed by a result from tamper monitoring component 70. The tamper monitoring component 70 sends a request (a) on startup, (b) whenever it has data to send, and (c) every few minutes; this gives tamper detection component 80 regular opportunities to send new commands. As shown in steps AA-KK, the component 70 can send all its device specifications at once along with the request for attestation. Also, as shown, in this implementation, periodic check-ins are replaced by a one-time dispatch of device specifications, based on which the tamper detection component 80 generates the commands for attestation. Accordingly, the component 80 generates commands and follows-up with additional if required.

Figure 1C:
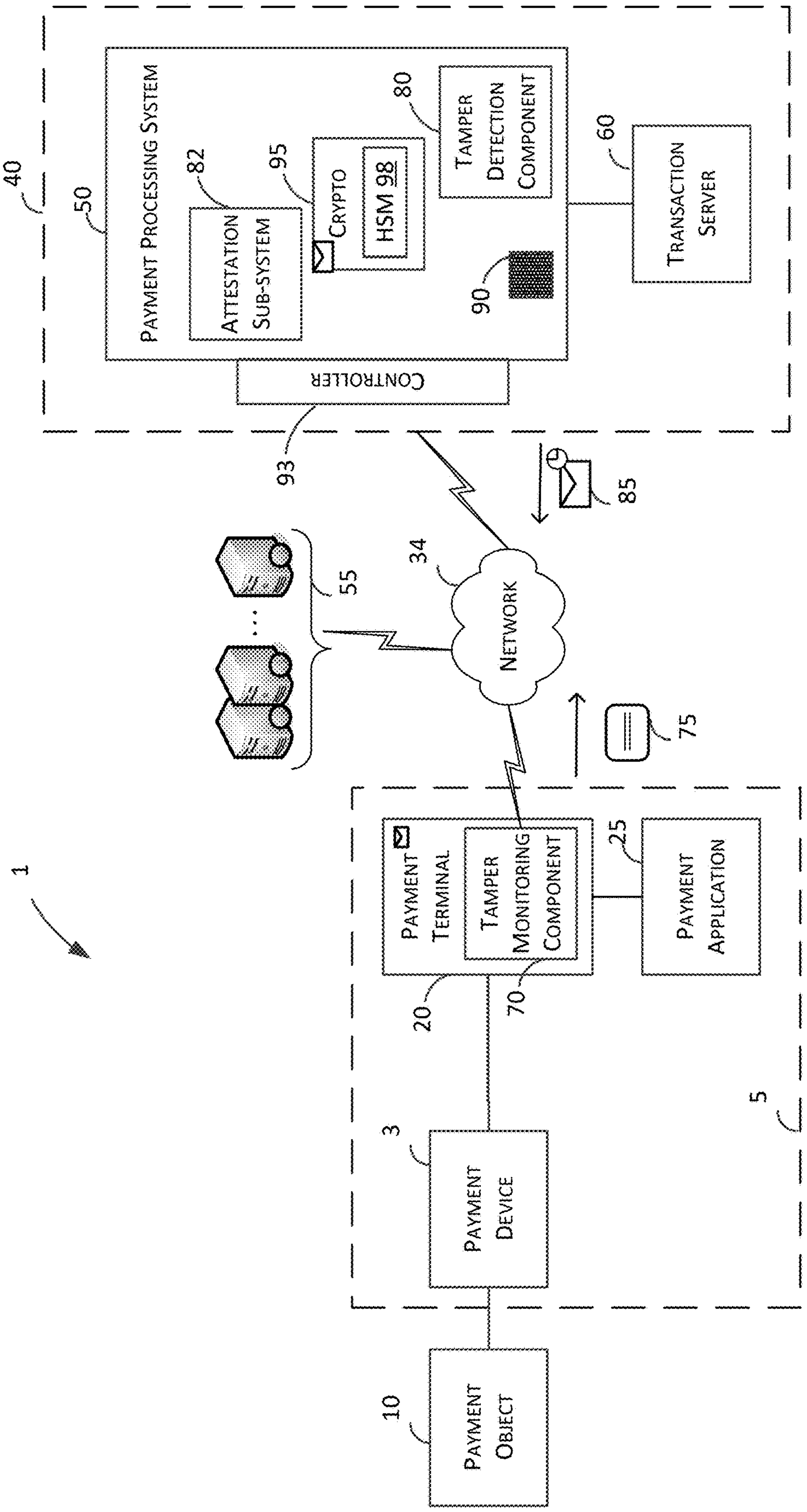
FIG. 1C shows an illustrative block diagram of a payment system in accordance with some embodiments of the present disclosure.

FIG. 1C depicts an illustrative block diagram of a network environment 1 in accordance with another embodiment of the present subject matter. In one embodiment, network environment 1 includes a payment object 10, payment terminal 20, network 30, and payment server 40. In an exemplary embodiment, payment server 40 may include a plurality of servers operated by different entities, such as a payment processing system 50 (also referred to as PPS 50) and a transaction server 60, such as an acquirer, issuer, card processing network or all. PPS 50 can include additional components, such as the tamper detection component 80, attestation sub-system 82, failover component 90, and crypto 95. Crypto 95 can further include or is associated with hardware security module (HSM) 98. The PPS 50 can also be associated to or controlled by a controller 93, which can be a distribution network or ticket traffic controller. The environment is also shown to include additional servers 55, which may be similar in operation as server 50. In one implementation, the server 55 can be designed to handle a certain type of request or certain level of risk, in that case, the high risk tickets may be sent to the server 55. In another example, the server 55 can be designed to operate on regulations pertaining to a different jurisdiction, rules or database. In another example the servers could correspond to payment servers at different locations or at the same location, available for load balancing or fail over management for example. The attestation tickets and/or session certifications are stateless and can travel from one server to another and can also be synchronized across different locations. These components of network environment 1 facilitate electronic payment transactions between a merchant and a customer in a secure and fast manner using attestation schemes synchronous to the payment transaction.

The electronic interactions between the merchant and the customer take place between the customer's payment object 10 and the merchant's payment terminal 20 (including the payment object reader 3). The customer has a payment object 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application. The merchant inserts the payment object 10 in the payment object reader 3 which is paired or otherwise connected to the payment terminal 20. The process of pairing is not described and will be understood to a person skilled in the art.

In some embodiments (e.g., for low-value transactions or for payment transactions that are less than a payment limit indicated by a NFC or EMV payment object 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment processing system 50 and one or more banks of the merchant and customer (e.g., a transaction server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

In some embodiments, payment terminal 20 may perform physical and logical scans or tests to collect information that is useful in determining whether or not a transaction is fraudulent or whether an attacker is attempting to tamper with the payment terminal 20. The payment terminal 20 may take corrective action (e.g., aborting a transaction or disabling one or more components of the payment terminal 20) based on a comparison of the collected information to one or more test criteria or commands. In some embodiments, the information may be transmitted to the payment server 40 (e.g., payment processing system 50) for processing. Payment server 40 may determine whether to take corrective action based on the received information as well as information from previous transactions and other ongoing transactions. Payment server 40 may provide a fraud determination message to the payment terminal 20, which may cause the payment terminal 20 to take corrective action. In some embodiments, payment server 40 may also generate updated test criteria for payment terminal 20 and provide the update for to payment terminal 20 for use in processing of future transactions.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In one implementation, the payment system 1 discloses methods and system to generate an attestation ticket 85 to indicate to any other entity that the payment terminal 20, the payment object reader 3, the payment application 25 (together referred to as payment platform 5) is secure and trusted and thus, any requests originating from the platform 5 is also secure. For example, if the payment platform is configured to receive software PINs, the platform can do so as long as it is attested. If the payment platform is not attested, for example, if the payment terminal is not attested, the reader 3 does not communicate with the payment terminal 20 or the payment application 25 until the payment processing system 50 has validated the payment terminal 20. Software PIN is just one of the many reasons why validation is performed, as will be understood by a person skilled in the art.

Operationally, a tamper detection component 80 is included within the payment processing system 50, and is configured to send attestation routines, specifying various scans and tests that it would like a client component, i.e., tamper monitoring component 70, to perform on the client device, i.e., the payment platform 5. For example, the attestation routine can include test criteria or commands instructing the tamper monitoring component 70 to: measure electrical characteristics of various components of the payment application, POS terminal, payment object reader, such as the payment interfaces that interact with the various types of payment devices and test operation of software components; monitor values such as current, voltage, impedance, and capacitance, to determine whether a component is acting in an abnormal manner; measure platform characteristics such as manufacturing or engineering tolerances, timing parameters, associated behaviors; check activation of certain communication ports; measurement of the phase error, of the frequency error, of the power and of the spectrum, power signal levels such as RSSI levels, RSSI vs. frequency measurements; measure engineering tolerances, hardware imperfections inherent to analog components of the device, radio frequency response to certain signals; measure physical, mechanical, magnetic, electro-mechanical, or operational characteristics; compare platform characteristics with the population of all other platforms or platforms within a geographical area; and so on.

The attestation sub-system 82 works with the tamper detection component 80 to receive and send the requests to the third party such as the terminal 20. Therefore, it is client-facing. It can also handle encryption and decryption, say using Crypto 95 that operates using keys stored in HSM 98.

The crypto can include units such as, but not limited to, microcontrollers, processors, interfaces, and/or devices, which may be attached, and/or communicate with the devices, such as the attestation sub-system 82. Cryptographic units support the authentication of communications from interacting agents, as well as allowing for anonymous transactions. Cryptographic units may also be configured as part of the CPU. The crypto 95 is shown to include HSM keys 95, which can be factory set and have keys corresponding to readers and servers.

The crypto 95 facilitates the secure accessing of resources on the PPS and facilitates the access of secured resources on remote systems; i.e., it may act as a client and/or server of secured resources. Cryptographic processor interfaces can allow for expedition of encryption and/or decryption requests by the cryptographic component. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Secure Socket Layer (SSL), Secure Hypertext Transfer Protocol (HTTPS), HMACs and/or the like. Employing such encryption security protocols, the server 50 may encrypt all incoming and/or outgoing communications. If the decoded data is found to be signed by HMACs, the session can be approved and accordingly, an attestation ticket and/or session certification can be generated.

The server 50 may be associated with a secure enclave unit (not shown) that may represent any logic, circuitry, hardware, or other structures for creating and maintaining a secured, protected, or isolated environment, in which an application or other software may run, execute, be loaded, or otherwise be present an information processing system. The secure enclave unit may further include encryption unit (not shown), which may include any logic, circuitry, or other hardware to execute any one or more encryption algorithms and the corresponding decryption algorithms, and may include logic, circuitry, or other hardware shared with another encryption unit in processor. In one embodiment, the secure enclave unit includes keys such as HSM keys.

Furthermore, the communicative instructions may be stored and/or transmitted in batches (e.g., batches of instructions) as programs and/or data components to facilitate desired operations.

The server 50 is also shown to include failover unit 90. If one component or an entire server goes down, the server 50 can allocate the processes, especially critical processes like validation of the session, to another processor like processor 55. A failover is the process of allocating a resource group (or application) to another node according to a failover policy. A failover may be triggered by the failure of a resource, a change in the node membership (such as when a node fails or starts), or a manual request by the administrator. The high availability network as shown includes a plurality of servers connected by a first network, wherein the servers communicate with each other to detect server failure and transfer applications to other servers on detecting server failure through a process referred to as "failover".

The server 50 also includes a traffic controller 93 to receive tickets from all devices and delegate to the appropriate server, for example to a server in a particular location, or associated with high-risk devices such that the commands are different, and so on. The controller 93 receives the tickets and analyzes a header filed or user information to determine where it should be routed.

In one implementation, the payment platform 5 (or one of the entities within such as the payment terminal 20) requests for an attestation ticket from the payment service system 50. For example, the tamper monitoring component 70 first requests the tamper detection component 80 for an attestation ticket to attest the payment terminal 20 or a network device, such as a communication device or a payment application executing on the terminal and so on. This can happen periodically, randomly or after or before expiration of an attestation ticket. In other implementations, the attestation may be triggered by a physical event, such as the merchant connecting the reader 3 with the payment terminal 20 or the merchant installing a new payment application 25 on the payment terminal 20.

In response, the tamper detection component 80 generates an attestation routine with exemplary test criteria or commands mentioned above. On receiving the commands, the tamper monitoring component 70 scans the payment platform 5 or a portion thereof for modification, faults or anomalies in the payment platform 5, including the applications, hardware, and operating system. The payment processing system, executing the tamper detection component 80, not just specifies the checks the payment platform 5 executes, but also collects the resulting data from the tamper monitoring component 70, and then analyzes the data from the payment monitoring component 70 (hereinafter referred to as "attestation data 75") to identify suspicious activity. The tamper detection component 80 and the tamper monitoring component 70 can communicate via an obfuscated and encrypted protocol, hereinafter referred to as "trusted channel," for example, implemented on top of HTTP Secure (HTTPS).

In one implementation, the tamper detection component 80, on analysis of the attestation data 75, determines that the payment platform has no known issues and no security threats have been identified and generates an attestation ticket 85 and sends to the payment terminal 70 (or even the reader 3) for future transactions. Accordingly, the tamper detection component 80 can validate a secure session between the reader 3 and the payment terminal 20 or application 25 as long as the attestation ticket is valid. When the reader 3 is connected to the payment terminal 20, the reader 3 can communicate with the payment terminal 20 by presenting the ticket to the reader 3, and also to the payment processing system 50 when a transaction is being processed. In contrast, if the tamper detection component 80 has detected tampering or otherwise security issues on the payment platform 5, such as the payment terminal 20 of the merchant, the tamper detection component 50 does not generate an attestation ticket 85 or generates an attestation ticket 85 with an error code indicating that the tamper detection component 50 failed to validate the secure session. The reason the payment processing system 50 generates a ticket in both cases is so that a fraudulent user cannot differentiate one device from another based on lack of ticket, and reverse-engineer to fake attestation.

The tamper detection component 80 can assign a lifetime to the attestation ticket 85 and can send it to the device in the platform 5 that requested validation so that the platform is not scanned or tested every time a transaction occurs. When the ticket expires, the tamper monitoring component 70 re-submits request for an attestation ticket. In one implementation, the attestation ticket can also be invalidated and/or re-generated in response to other attestation triggers even though the attestation ticket is otherwise valid as per lifetime.

Examples of attestation trigger includes, but are not limited to, pairing a new reader, different from reader 3, to the payment terminal, installing a payment application to an unknown device, detecting re-location of the reader or the POS terminal to a new location, for example known to be fraudulent, detecting insertion of a card from a fraudulent user, detecting a fraudulent card, detecting entry of a fraudulent device within an established geo-fence, and so on. As such, the attestation ticket can attest not just the platform but also the environment, such as the location where the merchant store is, the customers or payment objects or payment devices (such as Apple Watch®) that enter a geo-fence.

When a transaction occurs between the payment terminal 20 and the payment object reader 3, the payment object reader 3 requests the payment terminal 20 to share the attestation ticket 85. The reader 3 decrypts or sends the attestation ticket 85 as-is to the server 50, which determines from the content and/or timing whether the attestation ticket 85 is valid during the secure session. If it is valid, the server sends the approval both or to the reader and the terminal. If not, the rejection is sent to the parties.

Figure 2:
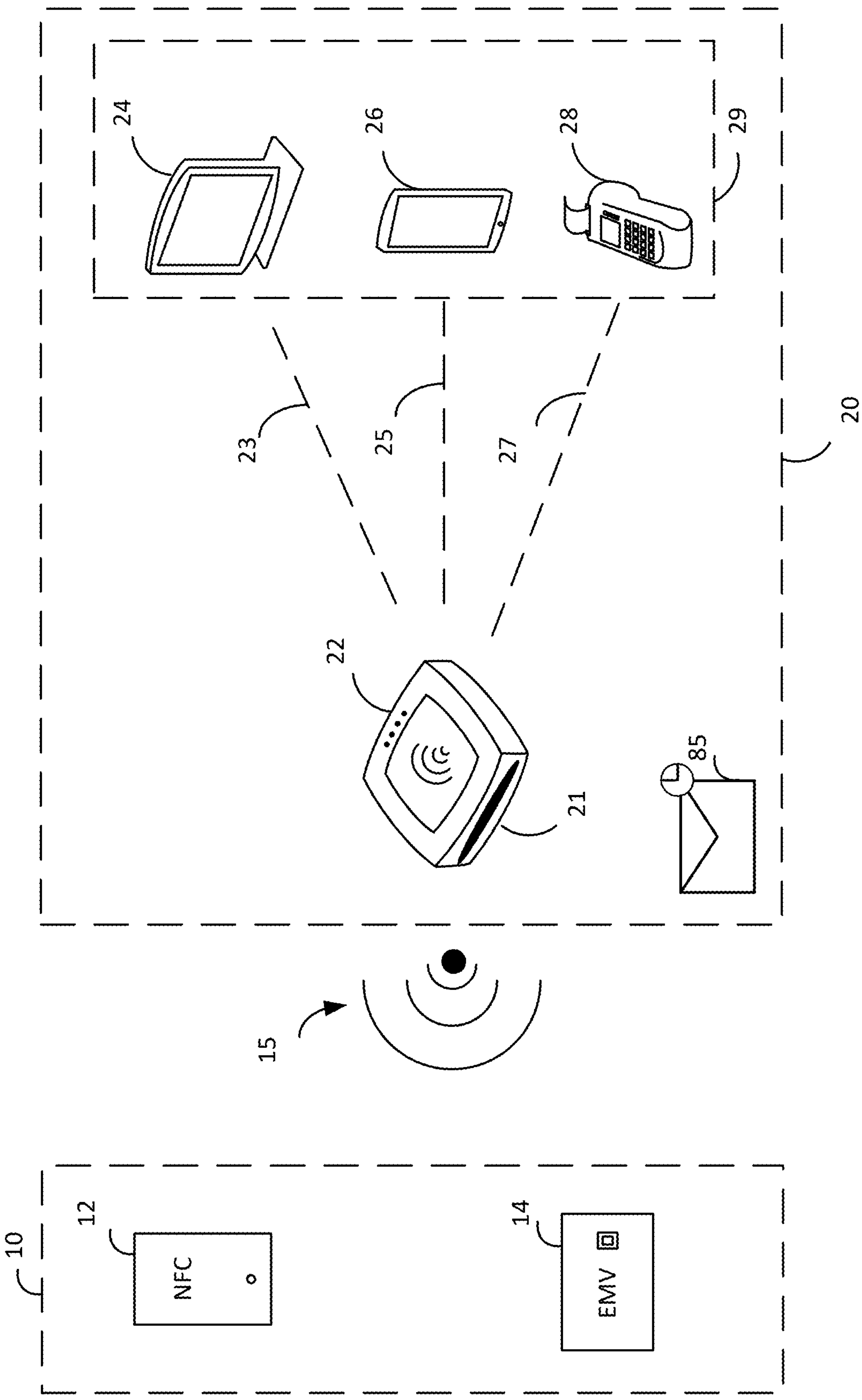
FIG. 2 depicts an illustrative block diagram of a payment device and payment terminal in accordance with some embodiments of the present disclosure.

FIG. 2 depicts an illustrative block diagram of payment object 10 and payment terminal 20 in accordance with some embodiments of the present subject matter. Although it will be understood that payment object 10 and payment terminal 20 of payment system 1 may be implemented in any suitable manner, in one embodiment the payment terminal 20 may comprise a payment object reader 22 (similar to or different from payment object 3) and a merchant device 29. However, it will be understood that as used herein, the term payment terminal may refer to any suitable component of the payment terminal, such as payment object reader 22. In an embodiment, the payment object reader 22 of payment terminal 20 may be a wireless communication device that facilitates transactions between the payment object 10 and a merchant device 29 running a point-of-sale application, such as payment application 25 shown in FIG. 1.

In one implementation, a payment processing system, such as payment processing system can validate the payment terminal 20 and allow it to conduct transactions with the payment object 10 via the reader 22 in a secure session. For this, the payment terminal has stored thereon attestation ticket 85 (as mentioned in FIG. 1) obtained from the payment processing system and the secure session is valid as long as the attestation ticket is. The attestation ticket 85 has associated with a lifetime after which the payment terminal 20 has to re-obtain the attestation ticket.

In one embodiment, payment object 10 may be a device that is capable of communicating with payment terminal 20 (e.g., via payment object reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment object reader 22 (e.g., in accordance with ISO 7816) and in some embodiments, may be inductively coupled to payment object reader 22 via a near field 15. A chip card 14 that is inductively coupled to payment object reader 22 may communicate with payment object reader 22 using load modulation of a wireless carrier signal that is provided by payment object reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment object reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment object reader 22 via near field 15 and may communicate with payment terminal 20 by active or passive load modulation of a wireless carrier signal provided by payment object reader 22 in accordance with one or more wireless communication standards such as ISO 14443 and ISO 18092.

Although payment terminal 20 may be implemented in any suitable manner, in one embodiment payment terminal 20 may include a payment object reader 22 and a merchant device 29. The merchant device 29 runs a point-of-sale application that provides a user interface for the merchant and facilitates communication with the payment object reader 22 and the payment server 40. Payment object reader 22 may facilitate communications between payment object 10 and merchant device 29. As described herein, a payment object 10 such as NFC device 12 or chip card 14 may communicate with payment object reader 22 via inductive coupling. This is depicted in FIG. 2 as near field 15, which comprises a wireless carrier signal having a suitable frequency (e.g., 13.56 MHz) emitted from payment object reader 22.

In one embodiment, payment object 10 may be a contactless payment device such as NFC device 12 or chip card 14, and payment object reader 22 and the contactless payment object 10 may communicate by modulating the wireless carrier signal within near field 15. In order to communicate information to payment object 10, payment object reader 22 changes the amplitude and/or phase of the wireless carrier signal based on data to be transmitted from payment object reader 22, resulting in a wireless data signal that is transmitted to the payment device. This signal is transmitted by an antenna of payment object reader 22 that is tuned to transmit at 13.56 MHz, and if the payment object 10 also has a suitably tuned antenna within the range of the near field 15 (e.g., 0 to 10 cm), the payment device receives the wireless carrier signal or wireless data signal that is transmitted by payment object reader 22. In the case of a wireless data signal, processing circuitry of the payment object 10 is able to demodulate the received signal and process the data that is received from payment object reader 22.

When a contactless payment device such as payment object 10 is within the range of the near field 15 it is inductively coupled to the payment object reader 22. Thus, the payment object 10 is also capable of modulating the wireless carrier signal via active or passive load modulation. By changing the tuning characteristics of the antenna of payment object 10 (e.g. by selectively switching a parallel load into the antenna circuit based on modulated data to be transmitted) the wireless carrier signal is modified at both the payment object 10 and payment object reader 22, resulting in a modulated wireless carrier signal. In this manner, the payment device is capable of sending modulated data to payment object reader 22.

In some embodiments, payment object reader 22 also includes an EMV slot 21 that is capable of receiving chip card 14. Chip card 14 may have contacts that engage with corresponding contacts of payment object reader 22 when chip card 14 is inserted into EMV slot 21. Payment object reader 22 provides power to an EMV chip of chip card 14 through these contacts and payment object reader 22 and chip card 14 communicate through a communication path established by the contacts.

Payment object reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment object reader 22.

Because a payment terminal 20 (e.g., a payment object reader 22 of payment terminal 20) interfaces with payment devices 10 and processes payment information, the payment terminal 20 is a prime target for attempts to engage in fraudulent transactions or to tamper with the payment terminal 20. Some attackers may engage in passive attacks, where they attempt to intercept NFC communications, read data being communicated over the physical connections with the EMV card, or intercept data from the magnetic stripe of a traditional swiping transaction. Moreover, signals carrying this and other critical information are transmitted within the payment object reader and processed by processors and other circuitry of the payment object reader. The information that is obtained by such attacks may then be used to engage in fraudulent transactions in a number of ways, such as making purchases using payment information or by obtaining information about the payment terminal 20 (e.g., authentication data, certificate info, or static data authentication (SDA) information) for use in engaging in fraudulent transactions through the payment terminal 20 or by emulating the payment terminal 20.

Some attackers may engage in attacks which involve utilizing devices or counterfeit cards to modify, inject, forward, or otherwise modify the signals (e.g., messages) exchanged between the payment object 10 and the payment terminal 20. Non-limiting examples of such attacks include yes-card attacks, replay attacks, pre-play attacks, downgrade attacks, relay attacks, and man-in-the middle attacks. These devices, counterfeit cards, and attacks are constantly being created, updated, and modified. As described herein, in some embodiments it may be possible to identify the presence of devices or counterfeit cards, or to recognize that an attack is taking place, by monitoring the messages that are being exchanged with the payment terminal 20, monitoring characteristics (e.g., timing, signal waveforms, etc.) of these messages, and by monitoring electrical characteristics or other parameters of the payment terminal 20. In one implementation, such identification can trigger the existing attestation ticket 85 to be invalidated or re-generated.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment object reader 22 via a communication path 23/25/27. Although communication path 23/25/27 may be implemented via a wired (e.g., Ethernet, USB, FireWire, lightning) or wireless (e.g., Wi-Fi, Bluetooth, NFC, or ZigBee) connection, in one embodiment payment object reader 22 may communicate with the merchant device 29 via a Bluetooth classic or Bluetooth low energy interface. In some embodiments processing of the payment transaction may occur locally on payment object reader 22 and merchant device 29, for example, when a transaction amount is small or there is no connectivity to the payment server 40. In other embodiments, merchant device 29 or payment object reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
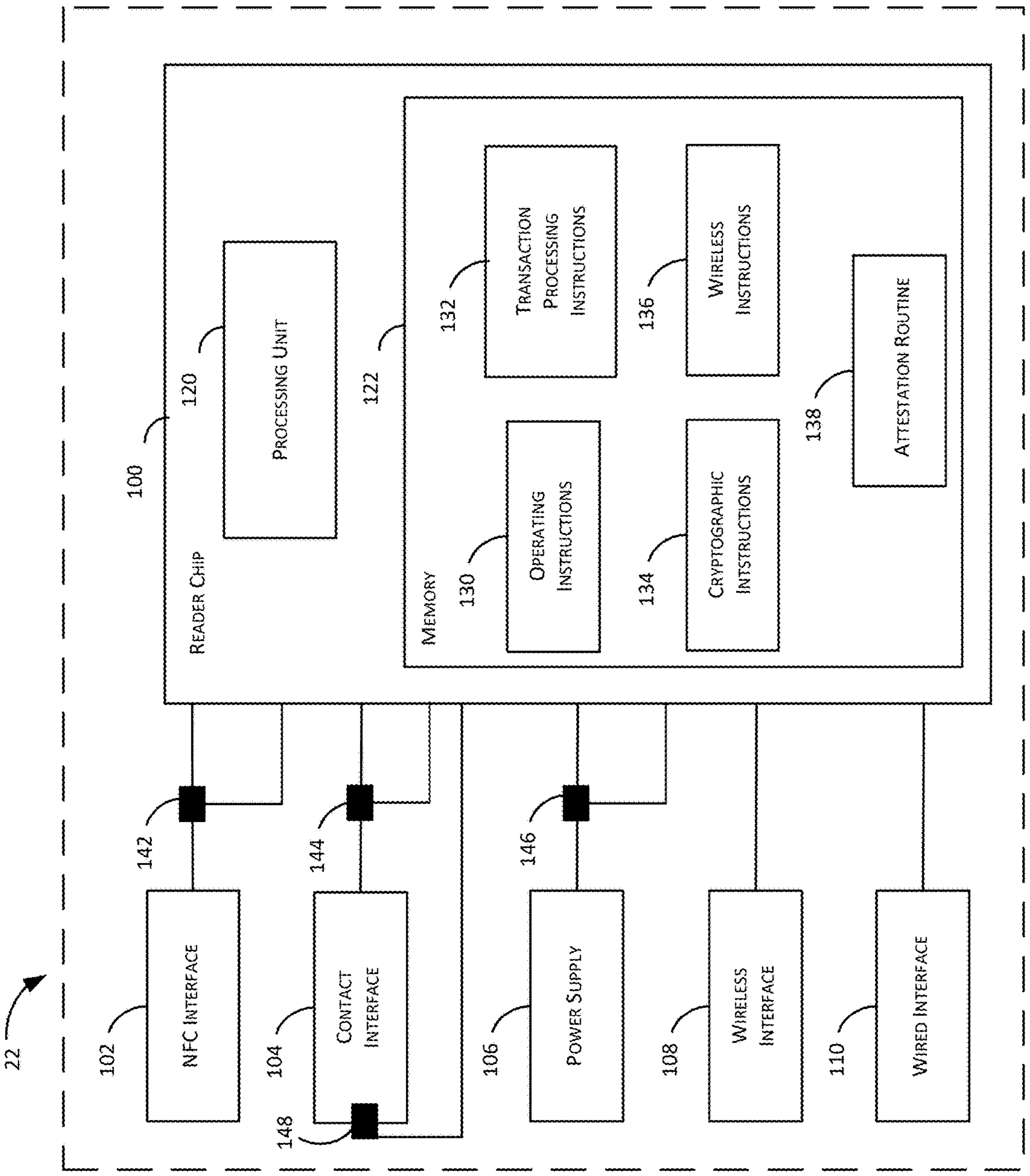
FIG. 3 depicts an illustrative block diagram of a payment object reader in accordance with some embodiments of the present disclosure.

FIG. 3 depicts a block diagram of an exemplary payment object reader 22 in accordance with some embodiments of the present disclosure. In one embodiment, payment object reader 22 may be a wireless communication device that communicates wirelessly with an interactive electronic device such as a merchant device 29, for example, using Bluetooth classic or Bluetooth low energy. Although particular components are depicted in a particular arrangement in FIG. 3, it will be understood that payment object reader 22 may include additional components, one or more of the components depicted in FIG. 3 may not be included in payment object reader 22, and the components of payment object reader 22 may be rearranged in any suitable manner. In one embodiment, payment object reader 22 includes a reader chip 100, a plurality of payment interfaces (e.g., a NFC interface 102 and a contact interface 104), a power supply 106, a wireless communication interface 108, and a wired interface 110. Payment object reader also includes a processing unit 120 and memory 122. Although in one embodiment the processing unit 120 and memory 122 will be described as packaged in a reader chip 100 and configured in a particular manner, it will be understood that processing unit 120 and memory 122 may be configured in any suitable manner to perform the functionality of the payment object reader 22 as is described herein. It will also be understood that the functionality of reader chip 100 may be embodied in a plurality of chips, each including any suitable combination of processing units and memory to collectively perform the functionality of reader chip 100 as described herein.

Payment object reader may also include a plurality of monitoring components, each of which is associated with and monitors one or more components of payment object reader 22. Although particular monitoring components may be described with respect to certain embodiments of the present disclosure, it will be understood that a monitoring component may include any suitable mechanical components, sensors, switches, hardware, processing units, or any other suitable components necessary to monitor information about components of payment object reader 22. Although monitoring components may be associated with any suitable components of payment object reader 22, in some embodiments NFC monitoring component 142 may be associated with NFC interface 102, contact monitoring component 144 may be associated with contact interface 104, power supply monitoring component 146 may be associated with power supply 106, and chip card detection component 148 may be associated with contact interface 104.

Processing unit 120 of reader chip 100 of payment object reader 22 may include any suitable hardware, software, memory, and circuitry as is necessary to perform and control the functions of payment object reader 22. A processing unit 120 may execute instructions stored in memory 122 of reader chip 100 to control the operations and processing of payment object reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to perform general processing and cryptographic processing functions based on instructions stored in memory 122, respectively. As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired interface 110 (e.g., USB, Ethernet, FireWire, and lightning), circuitry for interfacing with other communication interfaces or buses (e.g., $I^2C$, SPI, UART, and GPIO), circuitry for interfacing with a power supply 106 (e.g., power management circuitry, power conversion circuitry, rectifiers, and battery charging circuitry), and circuitry for interfacing with a contact interface 104 (e.g., power and communication circuitry for directly interfacing with an EMV chip of a chip card 14 that is inserted in slot 21).

In one embodiment, analog front end circuitry of reader chip 100 includes circuitry for interfacing with the analog components of NFC interface 102 (e.g., electromagnetic compatibility (EMC) circuitry, matching circuits, modulation circuitry, and measurement circuitry).

Security circuitry of reader chip 100 may include circuitry for protecting sensitive information such as encryption keys, merchant information, and customer information, as well as circuitry for responding to fraudulent transactions and tamper attempts (e.g., by taking corrective action). In one embodiment, security circuitry may include tamper protection circuitry and electronic fuses for selectively cutting off power or disabling one or more components of reader chip 100 in response to attempts to obtain improper access to reader chip 100, tamper with the payment object reader 22, or engage in fraudulent transactions. Security circuitry may cause power to be removed from components or for components to be disabled. The removal or power or disabling of components may be either permanent or temporary, which may vary based on the severity of a security threat. In some embodiments, security circuitry may include circuitry to provide electrical signals to components of payment object reader 22. Electrical signals may be provided to cause a particular response by the component of the payment object reader 22 (e.g., erasure of information, temporarily disabling a component, modifying operation of a component, or causing any other suitable response), or to impact a device or component that is coupled to or in communication with payment object reader 22. For example, in an embodiment an electrical signal (e.g., a signal having a particular voltage, current, waveform, etc.) may be provided to cause damage to a device that is attempting to intercept payment information or inject signals into the payment object reader 22 (e.g., a fraudulent EMV card or tamper device coupled to the contact interface 104). Security circuitry may also include circuitry that causes erasure, encryption, obfuscation, or other actions to be performed on sensitive information when a possible tamper attempt or fraudulent transaction is detected.

In one embodiment, monitoring component circuitry may include circuitry for interfacing with any of the monitoring components (e.g., monitoring components 142, 144, 146, and 148), such as signal conditioning circuitry, control circuitry, analog-to-digital conversion circuitry, digital-to-analog conversion circuitry, circuitry for measuring inductance or capacitance, timing measurement circuitry, any other suitable circuitry, or any combination thereof.

NFC interface 102 may provide for NFC communication with a contactless device such as NFC device 12 or chip card 14. Based on a signal provided by reader chip 100, an antenna of NFC interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment object reader 22 is inductively coupled to a contactless device, the contactless device may also modulate the carrier signal, which may be sensed by the NFC interface 102 and provided to the reader chip 100 for processing. Based on these modulations of the carrier signal, payment object reader 22 and a contactless device are able to communicate information such as payment information.

NFC monitoring component 142 may monitor any suitable electrical characteristics of NFC interface 102. In some embodiments, NFC monitoring component 142 may provide a signal path to provide one or more analog signals directly to reader chip 100, circuitry (e.g., sensors) for determining information about devices that are in proximity to NFC interface 102, circuitry (e.g., sensors) for providing measurements related to the NFC interface (e.g., signal-to-noise ratios, modulation ratios, energy levels, etc.), any other suitable monitoring component, or any combination thereof. These monitored aspects of NFC interface 102 may provide information that is indicative of attacks, such as the presence of improper devices in proximity to NFC interface 102 while payment information is being exchanged, abnormal modulations of the wireless carrier signal, or attempts to bypass or tamper with the NFC interface 102.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment object reader and the chip card are able to exchange information such as payment information.

Contact monitoring component 144 may monitor any suitable electrical characteristics of contact interface 104. In some embodiments, contact monitoring component 144 may provide a signal path to provide one or more analog signals directly to reader chip 100, such as from one or more of the pins of contact interface (e.g., an analog version of the signal that is seen at the I/O pin of the contact interface 104). Contact monitoring component 144 may also include circuitry (e.g., sensors) for providing measurements related to the contact interface (e.g., voltage, current, capacitance, inductance, or any other suitable electrical measurement at one or more of the pins of the contact interface 104), any other suitable monitoring component, or any combination thereof. These monitored aspects of contact interface 104 may provide information that is indicative of attacks, such as the insertion of a counterfeit card into EMV slot 21 (e.g., based on measured electrical characteristics at one or more pins of contact interface 104), the presence of an improper device intercepting information exchanged with a legitimate chip card via contact interface 104 (e.g., on the I/O pin), or the use of a device that simulates an EMV card (e.g., based on abnormal waveforms on the I/O line).

Chip card detection component 148 may also be associated with contact interface 104, and may provide electrical and mechanical components for determining when a chip card is inserted in EMV slot 21. In some embodiments, chip card detection component 148 may include one or more mechanical devices (e.g., switches) that are activated when a chip card meeting EMV card physical specifications (e.g., size, thickness, etc.) is inserted into the EMV slot 21. In some embodiments, chip card detection component 148 may include one or more sensors that sense information about the physical structure of the inserted card, such as size or materials. In some embodiments, chip card detection component 148 may include one or more electrical lines or sensors that provide information about the EMV chip of the inserted card, or in some embodiments, respond in a different manner when a measured electrical signal does not correspond to EMV specifications. It will also be understood that any other suitable chip card detection component 148 may be utilized in accordance with the present disclosure, and that a variety of types of chip card detection components 148 may be used in combination.

Power supply 106 may include one or more power supplies such as a physical connection to AC power or a battery. Power supply 106 may include power conversion circuitry for converting AC power and generating a plurality of DC voltages for use by components of payment object reader 22. When power supply 106 includes a battery, the battery may be charged via a physical power connection, via inductive charging, or via any other suitable method.

Power supply monitoring component 146 may monitor any suitable electrical characteristics of power supply 106. In some embodiments, power supply monitoring component 146 may provide a signal path to provide one or more analog signals directly to reader chip 100, such as from the power supply input, a battery, a charging circuit, power conversion circuitry, or any other suitable component of power supply 106. Power supply monitoring component 146 may also include circuitry (e.g., sensors) for providing measurements related to the power supply 106. These monitored power signals may provide information that is indicative of attacks, such as abnormal patterns of connections to a power supply or power usage patterns.

Wireless communication interface 108 may include hardware and software for communicating with external electronic devices using a wireless communication protocol such as Wi-Fi, Bluetooth classic, or Bluetooth low energy. In some embodiments, wireless communication interface 108 may allow payment object reader to communicate with one or both of merchant device 29 and payment server 40.

Wired interface 110 may include any suitable interface for wired communication with other devices or a communication network, such as USB, Lightning, Fire Wire, Ethernet, any other suitable wired communication interface, or any combination thereof. In some embodiments, wired interface 110 may allow payment object reader to communicate with one or both of merchant device 29 and payment server 40.

Memory 122 may include a plurality of sets of instructions for performing the processing operations of payment object reader 22, such as operating instructions 130, transaction processing instructions 132, cryptographic instructions 134, wireless communication instructions 136, and attestation routine 138, where the attestation routine 138 is obtained from a payment processing system, like payment processing system 50. Although not depicted in FIG. 3, in some embodiments sensitive information such as the cryptographic instructions 132, encryption keys, passwords, and other similar information may be stored in a logically and physically distinct memory from the other instructions and storage. Memory 122, or portions thereof, may be associated with a processor (e.g. a RISC processor), and may also be associated with particular hardware logic, such as hardware logic associated with electronic fuses, tamper protection circuitry, and cryptographic operations.

Operating instructions 130 may include instructions for controlling any suitable general operations of the payment object reader 22, such as internal communications, power management, processing of messages, system monitoring, sleep modes, user interface response and control, and the management of the other sets of instructions. In one embodiment, the operating instructions 130 may provide the operating system and applications necessary to perform most of the processing operations that are performed by the processing unit 120 of the reader chip 100 of payment object reader 22.

In addition, operating instructions 130 may include instructions for controlling the interaction between the payment object reader 22 and a payment object 10 (e.g., for interfacing with a payment device via the NFC interface 102 and contact interface 104). In one embodiment, the operating instructions may include instructions for generating a wireless carrier signal, providing the wireless carrier signal to NFC interface 102 (e.g., via analog front end circuitry), modulating the wireless carrier signal based on data to be transmitted according to a communication protocol, receiving a modulated wireless carrier signal from the NFC interface 102 (e.g., via analog front end circuitry), demodulating the received modulated wireless carrier signal according to a communication protocol, and determining received data from the demodulated signal. The operating instructions 130 may also include instructions for communicating with a chip card 14 through an I/O line of contact interface 104.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment object reader 22 (e.g., via wireless interface 108, based on wireless instructions 136). The operating instructions 132 facilitate processing of the payment, for example, by acquiring payment information via the NFC interface 102 or contact interface 104, invoking the transaction processing instructions 132 and cryptographic instructions 134 to process that payment information, and by generating responsive messages that are transmitted to the point-of-sale application of the merchant device via wireless interface 108 based on wireless instructions 136.

Operating instructions 130 may also include instructions for interacting with a payment processing system 50 at a payment server 40. In one embodiment, a payment processing system 50 may be associated with the payment object reader 22 and the point-of-sale application of the merchant device 29. For example, the payment processing system 50 may have information about payment object readers 22 and merchant devices 29 that are registered with the payment processing system 50 (e.g., based on unique identifiers). This information may be used to process transactions with servers of the merchant and customer financial institutions, for providing analysis and reports to a merchant, and aggregating transaction data. The payment object reader 22 may process payment information (e.g., based on the transaction processing instructions 132 and the cryptographic instructions 134) and communicate that processed payment information to the point-of-sale application, which in turn communicates with the payment processing system 50. In this manner, messages from the payment object reader 22 may be forwarded to the payment processing system 50 of payment server 40, such that the payment object reader 22 and payment processing system 50 may collectively process the payment transaction. In some embodiments, the operating instructions may facilitate communication of messages related to fraud and tampering (e.g., based on the attestation routine 138) with payment processing system 50. In this manner, payment object reader 22 and payment processing system 50 may interact to determine whether fraudulent transactions and tamper attempts are occurring, to determine corrective action to take in response to fraudulent transaction and tamper attempts, to update a transaction database (e.g., having compiled information for identifying fraudulent transactions and tamper attempts) of the payment processing system 50, and communicating updates regarding local test criteria used by the payment object reader 22.

Transaction processing instructions 132 may include instructions for processing payment transactions at payment object reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions.

Cryptographic instructions 134 may include instructions for performing cryptographic operations. Processing unit 120 may execute the cryptographic instructions to perform a variety of cryptographic functions, such as to encrypt, decrypt, sign, or verify a signature upon payment and transaction information as part of a payment transaction. Wireless communication instructions 136 may include instructions for communicating wirelessly with other devices such as an interactive electronic device (e.g., merchant device 29). Although wireless communication instructions 136 may be used for any suitable wireless communications interface 108, in one embodiment, the wireless communication interface 108 may be a Bluetooth interface (e.g., Bluetooth classic, Bluetooth low energy, or both) and the wireless communication instructions 136 may be for the operation of the Bluetooth interface. Processing unit 120 may execute the wireless communication instructions 136 to send and receive messages (e.g., in broadcast or connected modes) to communicate with the merchant device 29.

The attestation routine 138, where the attestation routine 138 is obtained from a payment processing system, like payment processing system 50 and may include instructions for identifying fraudulent transactions, tamper attempts, and other attacks on a payment terminal 20 such as payment object reader 22. Although attestation routine 138 may perform any suitable operations when executed by processing unit 120, in some embodiments, fraud tamper instructions may operate monitoring components (e.g., monitoring components 142, 144, 146, and 148), process monitoring signals received from the monitoring components, monitor messages exchanged with a payment device, send request messages to test for fraud or tampering, process response messages received in response to the request messages, identify fraud or tampering based on local test criteria, communicate information that relates to fraud or tampering to a payment server 40 (e.g., payment processing system 50), receive fraud determination messages from a payment server 40 (e.g., payment processing system 50), and take corrective action based on the local test criteria and the fraud determination messages.

In some embodiments, attestation routine 138 may include instructions for operating monitoring components (e.g., monitoring components 142, 144, 146, and 148). As described herein, a variety of types of monitoring components may be utilized in accordance with the present disclosure. The attestation routine 138 may provide instructions to control signals provided to monitoring component circuitry of reader chip 100, for example, to provide power, test signals, and other suitable signals to the monitoring components. In some embodiments, attestation routine 138 may provide instructions to control communication with one or more monitoring components, to provide control messages, receive data, or perform any other suitable functions with the monitoring components. In some embodiments, operating the monitoring components may include providing signals such as test signals or test waveforms to one or more of the monitoring components. For example, in one embodiment a test waveform may be provided to the I/O line of the contact interface 104 via monitoring component 144.

In some embodiments, attestation routine 138 may provide instructions to process monitoring signals received from the monitoring components. Monitoring signals may be received at reader chip 100 (e.g., via monitoring component circuitry) in a variety of forms, including analog signals, digital signals, and data signals. The attestation routine 138 may provide instructions for processing unit 120 to extract useful data from the received monitoring signals. In some embodiments, extracting useful data may include measuring some aspect of the monitored signal, such as voltage, current, impedance, capacitance, power, energy, waveform shape, etc. In an embodiment, contact monitoring component 144 may receive and monitor the analog signal on the I/O line of the contact interface 104, thus monitoring an output signal transmitted by the reader chip 100 and an input signal received via contact interface 104 during EMV communications. In some embodiments, the monitored signal may be digital or may be converted into a digital signal by an analog-to-digital converter. In some embodiments, attestation routine 138 may provide instructions for communicating with a monitoring component by exchanging data, for example, by communicating with monitoring components such as sensors over a data line or communication bus.

In some embodiments, attestation routine 138 may provide instructions to monitor messages exchanged with a payment object 10. For example, messages may be exchanged with a payment device via NFC interface 102 or contact interface 104. Processing unit 120 may generate and receive those messages, as described herein, and attestation routine 138 may include instructions for monitoring those messages and aspects of those messages, such as their content, sequence, and timing. In some embodiments, the messages may be monitored along with information received from one or more of the monitoring components. For example, the timing of messages that are sent and received over the I/O line via contact interface 104 may be determined based on a monitored signal received from contact monitoring component 144.

In some embodiments, attestation routine 138 may provide instructions to send request messages to test for fraud or tampering. Rather than merely monitoring the normal message flow during a payment transaction, attestation routine 138 may provide instructions for reader chip 100 to send request messages that are used to test for tamper devices and counterfeit cards, which may respond differently than properly functioning cards in response to atypical messages. In some embodiments, additional messages (e.g., error condition test requests) may be inserted into the normal messaging scheme for exchanging payment information between a payment device and the payment object reader. In other embodiments, messages that do not comply with the messaging protocol (e.g., error condition test requests) may be transmitted to the payment object 10. EMV cards that have not been compromised may have known behaviors, e.g., based on the card issuer or manufacturer.

In some embodiments, messages can be sent to test the functioning of the underlying circuitry of the payment device. For example, numerous requests (e.g., random number test requests) may be made for information that includes random numbers. The results may then be tested for randomness. As another non-limiting example, numerous requests may be made in succession, which may test the processing speed and capability of a chip card (e.g., message timing test requests), with any abnormal results likely to correspond to a counterfeit card or tamper device.

In some embodiments, attestation routine 138 may provide instructions to process response messages received in response to the request messages. For example, response messages may be associated with a timestamp (e.g., based on data acquired by a monitoring component or based on timing established by message content or by processing unit 102). In some embodiments, data such as a random number may be extracted from the message, or response messages may be associated with request messages.

In some embodiments, attestation routine 138 may provide instructions to identify fraud or tampering based on local test criteria. Although fraud or tampering may be identified based on any suitable information, in some embodiments fraud or tampering may be identified based on monitored signals acquired from the monitoring components, monitored responses, monitored timing, transaction information, payment information, or any combination thereof. Local test criteria may be criteria such as thresholds or logical tests that are available to run locally at the same payment terminal 20 device that is interfacing with the payment object 10 on which the (e.g., at a payment object reader 22 device that interfaces with NFC device 12 or chip card 14). Local test criteria may allow the payment terminal to respond quickly to certain types of fraudulent transactions and tamper attempts, without having to communicate with another device such as a payment server 40 (e.g., a payment processing system 50).

In some embodiments, local test criteria may be updated (e.g., by insertion of a memory device into a port of the payment terminal 20, receiving an update message over a network, or any other suitable manner for providing updates). Processing unit 120 may receive the update and update the local test criteria by modifying the attestation routine 138. Local test criteria may also change based on local conditions, which may be determined based on any suitable inputs (e.g., time, location, presence of a network connection, etc.). For example, the local test criteria may be modified (e.g., strengthened) if a payment terminal 20 is not connected to a network, and thus cannot communicate with a payment server 40 to receive fraud determination messages.

One exemplary local test criteria may be a timing test, which may be based on the timing of messages that are exchanged between payment terminal 20 and payment object 10 (e.g., messages exchanged pursuant to an EMV protocol or message timing requests intended to test the timing of particular responses). A tamper device or counterfeit card may not respond within the normal timing patterns as a result of manufacturing, or as the result of an attack (e.g., a relay attack). As described herein, information about the timing may be obtained, for example, based on monitored timing from a monitoring component. A timing test may be performed in a variety of manners. In some embodiments, the time to receive particular response messages (e.g., in an EMV protocol, an answer to reset (ATR) message, an authorization request cryptogram (ARQC) message, etc.) may be compared to a range or threshold. If the timing does not fall within the range or meet the threshold, the timing test may register as a failure. In some embodiments, other aspects of message timing may be considered, such as the relative time it takes for the card to send different message types, overall time to process transactions, etc.

Another exemplary local test criteria may be an error condition test. As described herein, in some embodiments error condition test requests may be transmitted and the timing and content of the responses may be monitored. A tamper device or counterfeit card may respond differently to error condition test requests than an actual chip card. In some embodiments, the monitored timing to respond may be compared to a range or threshold, the content of a response or set of responses may be checked against a logical test, or any combination of these and other techniques may be used to perform the error condition test. An exemplary error condition test may check to see if a response message was received, determine whether the time to receipt exceeds a threshold, and check the response content against expected response content.

Another exemplary local test criteria may be a random values test. A tamper device or counterfeit card may not produce random numbers as well as an actual chip card. As described herein, in some embodiments payment terminal 20 (e.g., reader chip 100 of payment object reader 22) may transmit random number test requests to a payment device (e.g., a chip card 14, via the contact interface 104 of payment object reader 22) and receive responses. Random numbers or other information that is based on a random numbers may be extracted from the responses. Statistical tests may be performed on the received random numbers to determine whether they are in fact likely to be random or whether there is a high probability that the values of the responses are not random.

Another exemplary local test criteria may be an electrical characteristics test. A tamper device or counterfeit card may impact electrical signals of a payment terminal 20 (e.g., payment object reader 22) or may produce electrical signals that are different from expected electrical signals. For example, electrical characteristics (e.g., voltage, current, impedance, capacitance, power, energy) of any of the pins of the contact interface 104 (e.g., the VCC pin, GND pin, RST pin, CLK pin, VPP pin, and I/O pin) may be determined from a monitoring component such as contact monitoring component 144. In some embodiments, a test waveform may be transmitted to one or more of these pins. One or more of the electrical characteristics may be compared to a range or threshold, and in some embodiments, statistics may be calculated from the electrical characteristics. The comparison or statistics may be used to identify a fraud or tamper attempt. For example, in an embodiment the contact monitoring component 144 may monitor the I/O line of contact interface 104. An analog monitoring signal provided by the contact monitoring component 144 may be converted to a digital signal (e.g., using an analog-to-digital converter). Processing unit 120 of reader chip 100 may analyze the waveform (e.g., shape, duty cycle, rise time, fall time, frequency, phase, etc.) of the digitized I/O line signal based on ranges or thresholds from the attestation routine 138 to determine whether there is likely to be a counterfeit card or tamper device at the contact interface.

Another exemplary local test criteria may be a card insertion test. During fraudulent transactions or tamper attempts, a tamper device or counterfeit card may not be present at appropriate times, may be present at inappropriate time, or may not have physical packaging (e.g., shape, material, etc.) that complies with specifications. In one embodiment, chip card detection component 148 may provide a detection signal indicating whether the chip card is detected, or in some embodiments, providing information (e.g., related to physical packaging) about an inserted chip card. Processing unit 120 of reader chip 100 may analyze the received detection signal in view of other information (e.g., monitored timing, response messages, electrical characteristics, etc.) to determine whether detection signal indicates that fraud or a tamper attempt is likely occurring (e.g., a detected card exceeding a threshold insertion time, while sending messages that do not result in a completed payment transaction).

Another exemplary local test criteria may be a power supply test. During fraudulent transactions or tamper attempts, a payment terminal 20 (e.g., a payment object reader 22) may remain powered on for an abnormal period of time (e.g., an extended period of time) or in abnormal patterns. In an embodiment, power supply monitoring component 146 may monitor power supply 106, and processing unit 120 of reader chip 100 may analyze the monitored power supply signal (e.g., based on thresholds, ranges, patterns, statistics, or other monitored signals) to determine whether fraud or a tamper attempt is likely occurring.

In some embodiments, attestation routine 138 may provide instructions that cause a payment terminal 20 (e.g., payment object reader 22 of payment terminal 20) to communicate information that relates to fraud or tampering to a payment server 40 (e.g., payment processing system 50, via merchant device 29 and network 30). As described herein, a payment terminal 20 may determine electrical characteristics based on signals and data received from monitoring components, may receive responses based on requests provided to a payment device, and may monitor timing of the functioning of the payment terminal (e.g., of monitored responses). In some embodiments, local test criteria may be used to determine fraud or a tamper attempt locally at the payment terminal 20. In some embodiments, some or all of the fraud and tamper detection may be performed remotely from the payment terminal 20 (e.g., the payment object reader 22). Thus, in some embodiments a server request message may be generated and sent to the payment server 40 (e.g., payment processing system 50). The server request message may include any suitable information, such as monitored electrical characteristics, monitored timing, monitored responses, statistics determined therefrom, transaction information, information about the payment terminal (e.g., location, etc.), environmental information (e.g., temperature, etc.), preliminary assessments based on local test criteria, or any suitable combination thereof. In some embodiments, the server request message may only be sent if the local test criteria indicate that there is likely to be a fraudulent transaction or tamper attempt, for a subset of local test criteria, or based on the severity of a possible fraudulent transaction or tamper attempt.

In some embodiments, attestation routine 138 may provide instructions to receive fraud determination messages from a payment server 40 (e.g., payment processing system 50). As described herein, a payment server 40 (e.g., payment processing system 50) may utilize the information provided in server request messages to determine whether a fraudulent transaction or tamper attempt is occurring, and may respond with a fraud determination message (e.g., by transmitting the fraud determination message to payment object reader 22 via network 30 and merchant device 29). The attestation routine 138 may cause processing unit 120 of reader chip 100 to extract information from the fraud determination message, such as an indication that a fraudulent transaction or tamper attempt is occurring, information about the type of fraudulent transaction or tamper attempt, and instructions regarding a type of corrective action to perform.

In some embodiments, attestation routine 138 may provide instructions for taking corrective action based on the local test criteria and the fraud determination message. Although any suitable corrective action may be taken, in some embodiments corrective action may include aborting a transaction (e.g., ceasing communications with a payment object 10), temporarily or permanently removing power or disabling one or more components of the payment terminal 40 (e.g., using tamper protection circuitry, security circuitry, or electronic fuses), querying the payment object 10 (e.g., sending request messages) to gather additional information about the fraudulent transaction or tamper attempt, or employing countermeasures (e.g., utilizing security circuitry to switch a high current to the I/O line of the payment object 10 via contact interface 104) in an attempt to damage the counterfeit card or tamper device.

As mentioned previously, the results of the attestation routine 138 are obtained as attestation data 75 and sent to the payment terminal and then to the payment processing system for generation of an attestation ticket that indicates that the reader is secure for all future transactions.

Figure 4:
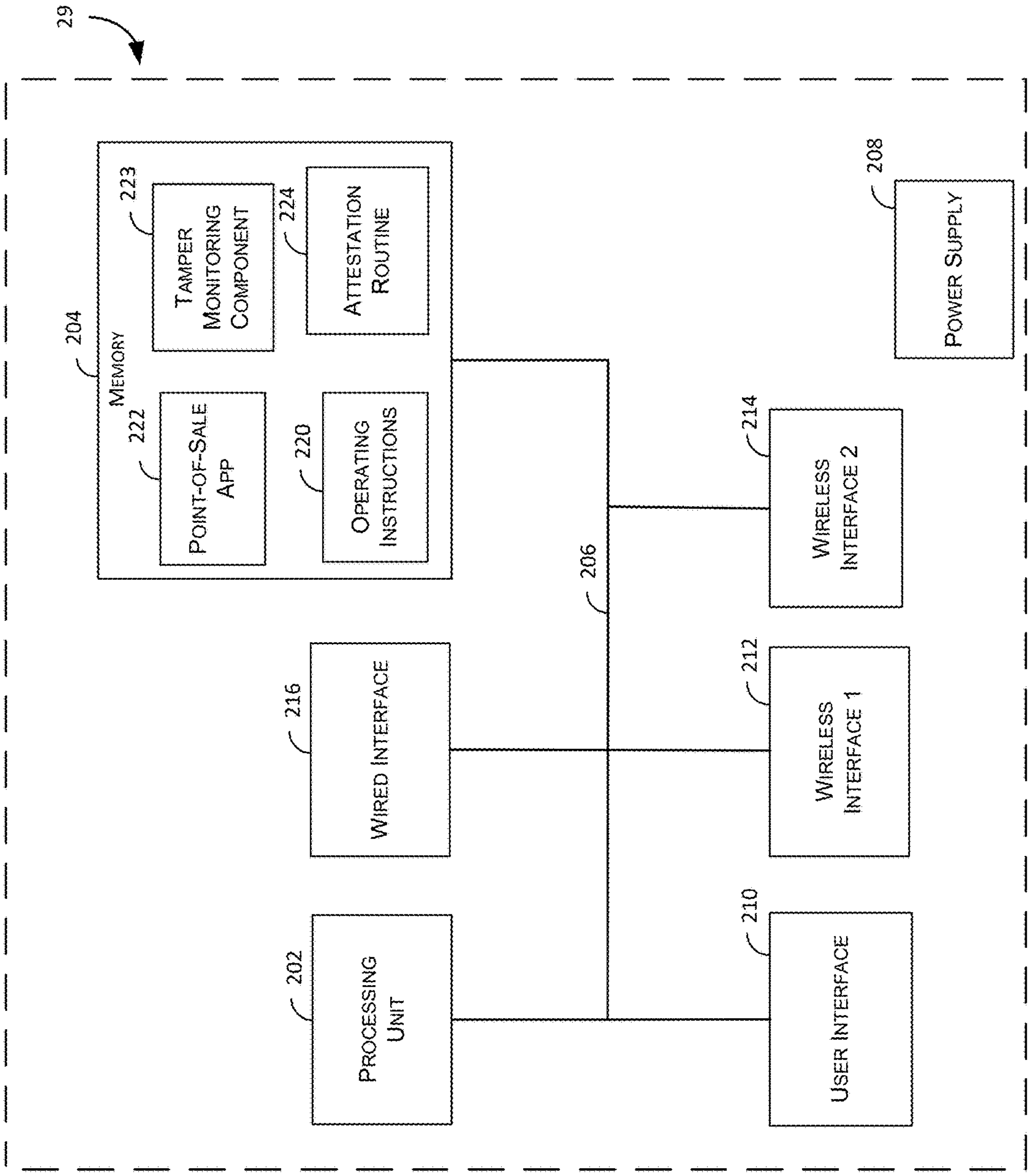
FIG. 4 depicts an illustrative block diagram of a merchant device in accordance with some embodiments of the present disclosure.

FIG. 4 depicts an exemplary merchant device 29 in accordance with some embodiments of the present disclosure. Although a merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 of may be a general purpose processor running instructions for a mobile operating system, programs, and applications based on instructions that may be stored in memory 204. The memory may include any suitable memory types or combination thereof as described herein, such as flash memory and RAM memory, for storing instructions and other data and providing a working memory for the execution of the operating system, programs, and applications of the merchant device 29. In one embodiment, the memory may include a plurality of sets of instructions, such as operating instructions 220, point-of-sale application instructions 222, and attestation routine 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as $I^2C$, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for any suitable user interface, such as a touchscreen interface, voice command interface, keyboard, mouse gesture recognition, any other suitable user interface, or any combination thereof. In one embodiment, the user interface 210 may be a touchscreen interface that displays an interactive user interface for programs and applications such as a point-of-sale application running on the merchant device 29, and provides prompts and displays related to fraudulent transactions, tamper attempts, and corrective action.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. A first wireless communication interface 212 may be a wireless communication interface that primarily communicates with payment object reader 22 (e.g., a Bluetooth classic and/or Bluetooth low energy interface) while a second wireless communication interface 214 may be a wireless communication interface (e.g., WiFi) that primarily communicates with a payment processing system 50 of payment server 40 (e.g., via the internet).

Merchant device may also include a wired interface 216, which may include any suitable interface for wired communication with other devices or a communication network, such as USB, Lightning, FireWire, Ethernet, any other suitable wired communication interface, or any combination thereof.

Memory 204 may include a plurality of sets of instructions for performing the processing operations of merchant device 29, such as operating instructions 220, point-of-sale application instructions 222, a tamper monitoring component 223, attestation routine 224, and any other suitable instructions for operating the merchant device 29 (e.g., instructions related to the operation of one or more other applications or components of the merchant device 29).

Operating instructions 220 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface may be controlled in accordance with the instructions of programs and applications of the operating instructions 220, point-of-sale application instructions 222, and the attestation routine 224. In one embodiment, the point-of-sale application instructions 222 may include instructions to display notices of fraudulent transactions and tamper attempts, and to display a menu or other selection option in order to choose a corrective action to be taken by a payment object reader 22. The user interface 210 may display the menu or other selection option based on the operating instructions 220 executed by processing unit 202.

Operating instructions 220 may also include instructions for interacting with a payment object reader 22 and for interacting with a payment processing system 50 at a payment server 40. The payment object reader 22 and/or the application running on the merchant device 29 may be known (e.g., via a registration process) to the payment processing system 50, such that the merchant device 29 may process payments with the payment processing system 50 according to the point-of-sale application instructions.

Point-of-sale application instructions 222 include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. In some embodiments, the point-of-sale application instructions may include instructions for providing a rich display of information relating to fraudulent transactions and tamper attempts, and options for selection of corrective action to take in response to fraudulent transactions and tamper attempts.

The tamper monitoring component 223 includes circuitry and instructions configured to execute the attestation routine 224. As per commands within the attestation routine, the tamper monitoring component 223 detects parameters, either individually or in combination, rise-time signatures, spectral values, signal transients, hardware impairments, channel characteristics, power values, signal strength, identity of the received signals, say in terms of frequency or phase, timing parameters associated with the received signal, and the like, to obtain physical and operational characteristics of the device and the applications running on it.

The tamper monitoring component 223 may generate specific sequences or payload, based at least on the commands in the attestation routine 224. The payload may either be common between all devices being validated or unique for each device. The payload can be a data signal or a series of instructions that triggers the device r certain components, like the transmitter or sensors, to respond. The nature of responses from the terminal or the content therein is said to be unique for each device and is saved as attestation data. The attestation data from the selected devices can also be in the form of affirmative or negative answers to queries loaded in the commands. The responses, whether binary or textual information, can be conditioned and/or encrypted before it is sent back to the server, such as the payment processing system.

Attestation routine 224 may include any suitable instructions for assisting with fraud and tamper detection, including instructions for offloading a portion of the testing from payment object reader 22, providing options for a user interface for controlling operations of payment object reader 22, and communications with a payment server 40 (e.g., a payment processing system 50). In some embodiments, merchant device 29 may perform some or all of the local analysis (e.g., based on the local test criteria) of information (e.g., monitored responses, monitored timing, and electrical characteristics, transaction information, environmental information, payment object reader information) received from payment object reader 22. In this manner, payment object reader may require less processing capability, or in some embodiments, more complex analysis may be performed at merchant device 29.

Attestation routine 224 may include instructions for merchant device 29 (or an integrated payment terminal 20) to provide an interface to respond to potential fraudulent transactions or tamper attempts. In some embodiments, a display may be generated for the user interface that provides information such as a warning of a tamper attempt, and in some embodiments, options to override the warning and process the transaction. Other user interface information may include instructions for handling of the fraudulent transaction or tamper attempt. In some embodiments, user interface information may include an interface for modifying local test criteria, the selection of test criteria to be performed at payment object reader 22, the assignment of different forms of corrective action to different types of fraudulent transactions or tamper attempts, any other suitable user interface information, or any suitable combination thereof.

As mentioned previously, the results of the attestation routine 224 are obtained as attestation data 75 and sent to the payment terminal and then to the payment processing system for generation of an attestation ticket 85 that indicates that the payment terminal is secure for all future transactions as long as the ticket is valid or until an event triggers the attestation to be invalidated or re-generated, for example, reader is disconnected or terminal is restarted.

Figure 5:
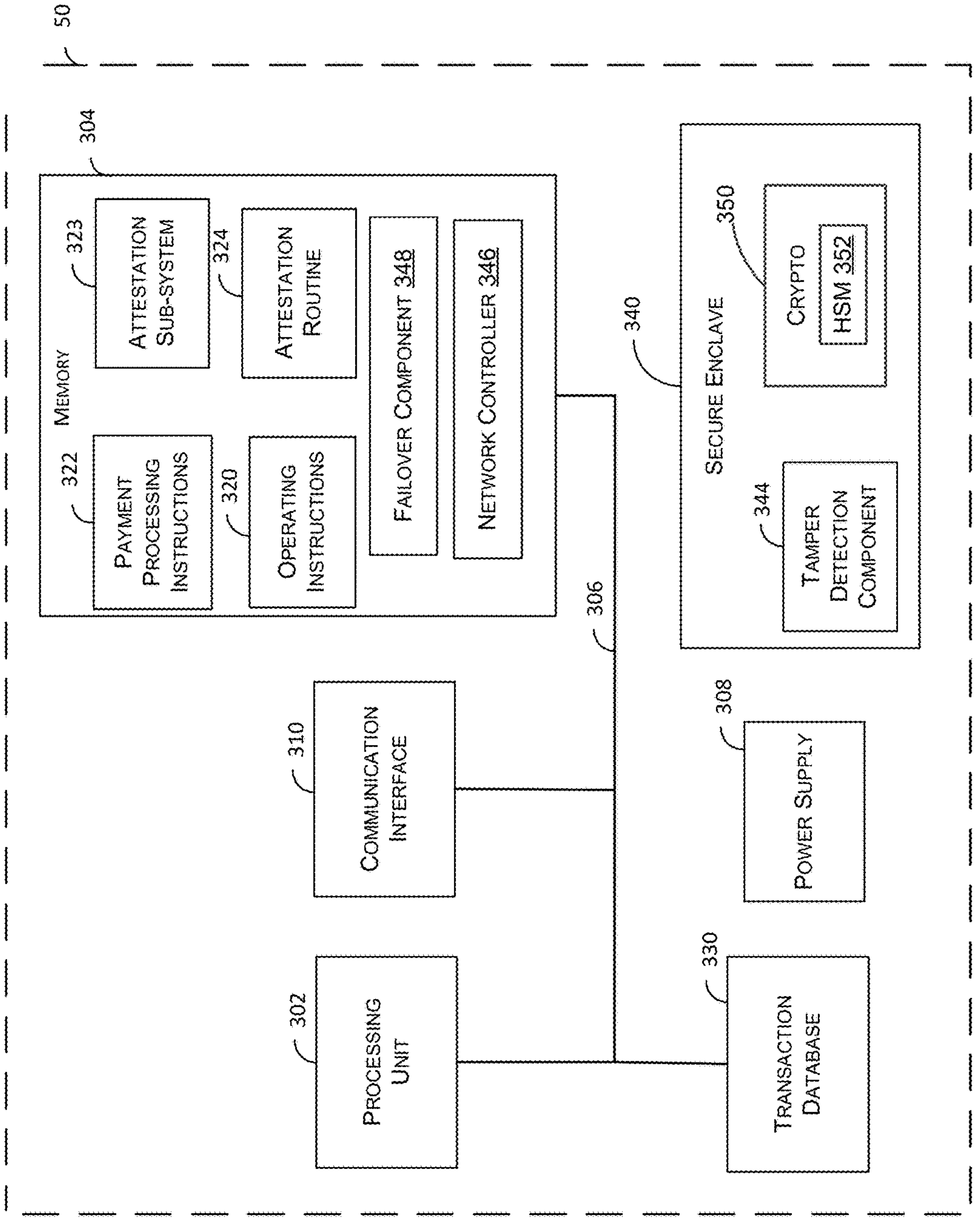
FIG. 5 depicts an illustrative block diagram of a payment processing system in accordance with some embodiments of the present disclosure.

FIG. 5 depicts an exemplary payment processing system 50 of a payment server 40 in accordance with some embodiments of the present disclosure. Although the payment processing system 50 is depicted as a single server, it will be understood that the operations and memory of the payment processing system 50 may be distributed over any suitable number of servers. Although particular components are depicted in a particular arrangement in FIG. 5, it will be understood that the payment processing system 50 may include additional components, one or more of the components depicted in FIG. 5 may not be included in the payment processing system 50, and the components of payment processing system 50 may be rearranged in any suitable manner. In one embodiment, payment processing system 50 includes at least a processing unit 302, a memory 304, an interface bus 306, a power supply 308, a communication interface 310, and a transaction database 330.

In one embodiment, the payment processing system 50 includes a processing unit 302 and memory 304 that are configured to control and perform the necessary operations of the payment processing system 50. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment processing system 50. In one embodiment, the memory may include a plurality of sets of instructions, including but not limited to operating instructions 320, payment processing instructions 322, attestation sub-system 323, a failover component 348, a network controller 346 or an instance of it, and attestation routine 324. Within a secure enclave 340, tamper detection component 344, crypto 350, and HSM 352 can be saved.

The processing unit 302 may execute the instructions of memory 304 to interact with and control one or more other components of the payment processing system 50. Although the processing unit 302 may communicate with other components of the payment processing system 50 in any suitable manner, in one embodiment the processing unit 302 may utilize an interface bus 306. Interface bus 306 may include one or more communication buses such as $I^2C$, SPI, USB, UART, and GPIO. In one embodiment, the processing unit 302 may execute instructions of the memory 304 and based on those instructions may communicate with the other components of the payment processing system 50 via the communication buses of interface bus 306.

The payment processing system 50 may also include a power supply 308. Power supply 308 may include power conversion circuitry for converting AC power and/or generating a plurality of DC voltages for use by components of the payment processing system 50. In some embodiments, power supply 308 may include a backup system such as a battery backup, to avoid interruptions in service during power outages. Although not depicted as physically connected to the other components of the payment processing system 50 in FIG. 5, power supply 308 may supply a variety of voltages to the components of the payment processing system 50 in accordance with the requirements of those components.

The payment processing system 50 may also include a communication interface 310. Although communication interface 310 may include any suitable communication interface or combination thereof, in some embodiments the communication interface 310 may utilize higher speed communication interfaces such as WiFi, cellular, Ethernet, or fiber optics. The communication interface may establish a secured connection (e.g., via TLS or SSL) with a payment terminal 20 (e.g., payment object reader 22 via merchant device 29) in order to exchange messages relating to potentially fraudulent transactions or tamper attempts (e.g., server request messages and fraud determination messages). The communication interface may also communicate with other servers of the payment server 40 such as transaction processing servers, which may, in some embodiments, be located remotely from the payment processing system 50 and operated by different entities than those that control the payment processing system 50. For example, in one embodiment, the payment processing system 50 may be operated by an entity that provides one or more of the payment object reader 22, merchant device 29, or point-of-sale application. Transaction processing servers may be associated with and operated by one or more of the merchant, issuer, or customer banks.

Memory 304 may include a plurality of sets of instructions for performing the processing operations of the payment processing system 50, such as operating instructions 320, payment instructions 322, attestation routine 324, and any other suitable instructions for operating the payment processing system 50 (e.g., instructions related to the operation of one or more other applications or components of the payment processing system 50).

Operating instructions 320 may include instructions for controlling any suitable general operations of the payment processing system 50, such as internal communications, power management, control of communication devices, control of other hardware of the payment processing system 50, any other suitable instructions, or any combination thereof. In one embodiment, the operating instructions may provide instructions for the operating system of the payment processing system 50 as well as most drivers, programs, and applications operating on the payment processing system 50.

Operating instructions 320 may also include instructions for interacting with a merchant device 29. In one embodiment, the payment processing system 50 may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment object reader 22 (e.g., via merchant device 29), and/or transaction processing servers. In one embodiment, the payment processing instructions may include information about each payment object reader 22 and merchant device 29 having an installed point-of-sale application. In addition to performing payment processing functions such as providing payment information such as amount and a credit card number to a transaction processing system and communicating responses back to the merchant, the payment processing system 50 may also perform complex analysis of merchant data that may be used to provide reports, metrics, or other data to a merchant (e.g., a merchant operating a plurality of merchant devices 29 at a plurality of locations). Payment processing instructions 332 may also include instructions for accessing encryption keys such as a shared private key or a key of a public/private key pair for encrypting and decrypting data provided by one or more of a payment object 10, payment object reader 22, or merchant device 29.

Attestation routine 324 include instructions for identifying fraudulent transactions or tamper attempts based on communications received from payment terminal 20 (e.g., from a payment object reader 22 via merchant device 29 and network 40), providing messages to payment terminal 20, logging data (e.g. electrical characteristics, monitored responses, monitored timing, transaction information, environmental data, payment object reader information, etc.) received from the payment terminal 20 to transaction database 330, and analyzing data stored in transaction database 330 to identify and update test criteria.

Attestation routine 324 may provide instructions for payment processing system 50 to receive and process messages (e.g., a server request message) from payment terminal 20 (e.g., from payment object reader 22 via merchant device 29, network 30, and communication interface 310). The received messages may include information such as monitored electrical characteristics, monitored timing, monitored responses, transaction information, information about the payment terminal (e.g., location, model, paired merchant devices, etc.), environmental information (e.g., temperature, etc.), statistics determined therefrom, and preliminary assessments based on local test criteria. This information may be compared to server test criteria to determine whether a fraudulent transaction or tamper attempt is occurring. In some embodiments the server test criteria may include the test criteria described above with respect to the local test criteria, as well as additional test criteria involving comparisons with related transactions, concurrent transactions, previous transactions, and feedback information. In some embodiments, server test criteria may be dynamic (e.g., utilizing dynamic thresholds) such that they may be regularly updated based on recent data acquired from payment terminal 20 and other payment terminals 20. The server test criteria may also involve a comparison to similar data from other concurrent or recent transactions, which may allow for detection of patterns of fraudulent activity that may not be readily identified at a single payment terminal (e.g., if a large percentage of recent transactions having similar electrical characteristics, monitored timing, payment terminal characteristics, environmental information, or monitored messages are fraudulent).

Attestation routine 324 may provide instructions for payment processing system 50 to provide messages to payment terminal 20 (e.g., via fraud determination messages). Once payment processing system 30 has determined whether a transaction is fraudulent or if a tamper attempt is occurring, a fraud determination message may be generated. The fraud determination message may include information such as an indication that a fraudulent transaction or tamper attempt is occurring, information about the type of fraudulent transaction or tamper attempt, and instructions regarding a type of corrective action to perform. The fraud determination message may then be transmitted to the payment terminal 20.

Attestation routine 324 may provide instructions for logging data (e.g. electrical characteristics, monitored responses, monitored timing, transaction information, payment terminal information, environmental data, etc.) received from the payment terminal 20 to transaction database 330. In addition to data received from payment terminal 20, any other suitable information such as the results of server test criteria and suggested corrective action may be stored in the transaction database 330.

Attestation routine 324 may provide instructions for analyzing data stored in transaction database 330. Transaction database 330 may include a large store of transaction information, with millions of transactions being updated daily. The information stored in transaction database 330 includes any suitable information such as electrical characteristics, monitored timing, monitored responses, transaction information, payment terminal information, environmental data, indications of whether a transaction was fraudulent or a tamper attempt has occurred, and a type of corrective action.

The Secure Enclave 340 is a set of instructions that provides a safe place for an application to execute code and store data inside in the context of an OS process. An application that executes in this environment is called an enclave. Enclaves are executed from the Enclave Page Cache (EPC). The enclave pages are loaded into EPC by an OS. Whenever a page of an enclave is removed from the EPC, cryptographic protections are used to protect the confidentiality of the enclave and to detect tampering when the enclave is loaded back into the EPC. Inside the EPC, enclave data is protected using access control mechanisms provided by the processor.

The crypto 350 and HSM 352 is similar in construction and operation to crypto 90 and HSM 98. The tamper detection component 344 and the attestation sub-system 323 shares the tasks performed by tamper detection component 80 according to one embodiment. The tamper detection component 344 validates session, while the attestation sub-system 323 provides attestation tickets.

In addition, it may be determined by other electronic systems (e.g., a transaction server 60) or by other methods (e.g., business or consumer reporting of fraudulent transactions) that fraudulent transactions were not captured by payment object reader 22 (e.g., by the local test criteria) or payment server 50 (e.g., by the server test criteria). Such transactions may be referred to as false negatives. It may also be determined by other electronic systems (e.g., a transaction server 60) or by other methods (e.g., business or consumer reporting of fraudulent transactions) that transactions were improperly denied by payment object reader 22 (e.g., by the local test criteria) or payment server 50 (e.g., by the server test criteria). Such transactions may be referred to as false positives. The false positives and false negatives may provide feedback that may be associated with the information for a transaction and stored in transaction database 330, based on attestation routine 324.

It may also be determined by other electronic systems (e.g., a transaction server 60) or by other methods (e.g., business or consumer reporting of fraudulent transactions) that new or modified methods of engaging in fraudulent transactions or tamper attempts are being performed, and criteria for these may be provided to payment processing system. Such criteria may provide feedback that is referred to as externally updated criteria. Local test criteria and server test criteria may be updated based on these externally updated criteria and attestation routine 324.

Although analysis of the data stored at transaction database 330 may be performed in any suitable manner, in some embodiments machine learning techniques may be used to analyze the data. It will be understood that the availability of this large volume of information relevant to fraudulent transactions and tamper attempts enables complex analyses that improve the responsiveness of the payment processing system. By fine tuning server test criteria and local test criteria, the test criteria can be dynamically calibrated to avoid false positives (e.g., false determinations that a transaction is fraudulent or that a tamper attempt is occurring) while capturing new types of attacks or improved attacks. Payment processing system 50 may determine that certain data captured by payment terminal 20 is highly likely to be the result of a fraudulent transaction or tamper attempt, and generate local test criteria accordingly. The local test criteria may then be updated via an update message. Payment processing system may similarly update the server test criteria.

In one embodiment, the client (i.e. the payment terminal 20) and server 50 exchange messages until the server cannot contribute any more. Every message from the server may have a frame with more instructions or messages, except for the last one, which includes the attestation ticket 85. When the client receives a ticket 85, it writes it to disk (overwriting the previous one, if any). The contents of the attestation ticket 85 ciphertext may not change. It can be a JSON object with a last-approved time, a last-denied time, validity time (that is the time for which the ticket is valid), and device identifiers, such as the device name (e.g., iPhone®, iPad®, and so on), version of operating system, version of payment application, type of device (tablet, phone, etc.). The last-approved time may be same as the expiration time that appears in plaintext; this ensures that the expiration time is included in the authenticated data. In some implementations, server 50 always returns a ticket, even if it has detected tampering. The ciphertext part of the ticket indicates whether the client should be approved or not. In some implementations, the frequency of check-ins may not be tied to ticket duration. Some implementations restrict the size of the ticket while other implementations keep the ticket unbounded. For example, the ticket size can be kept to 1 KB, or can be kept based on the number of available device identifiers. The size can be bound using a fail-open strategy. The attestation ticket is created as explained above. If the ticket size satisfied a threshold, the server can replace it with a ticket containing the minimum amount of information for an approval, and log a warning.

The contents of the attestation ticket are opaque to any party that is not server 50, however some contents can be made visible to certain parties. For example, in one implementation, the expiration time associated with the validity of the attestation ticket can be made available to all devices. In one scenario, clients examine a ticket's expiration time to see if it's still valid before requesting for a secure session. In one scenarios, since expiration times are in UNIX time, there are no timezone parity. However, clients may not have a reliable way to keep track of UNIX time, so their clocks may be very far out of sync with the servers' clock. To this end, the ticket can include both the creation-time field as well as an expiration-time. This helps determine duration of the ticket.

In some implementations, an example of an attestation ticket can be substantially of the form:

```
message SealedTicket {
    optional uint64 expiration = 1;
    optional bytes ciphertext = 2;
  }
  message GetTicketRequest {
    optional bytes frame = 1;
      optional SealedTicket current_ticket = 2;
  }
  message GetTicketResponse {
    // ms _frame if the server has more commands to send; new_ticket
if the exchange is
    // over.
    optional bytes ms_frame = 1;
    optional SealedTicket new_ticket = 2;
  }
  service PaymentServerService {
    rpc GetTicket (GetTicketRequest) returns (GetTicketResponse) { }
      rpc ValidateSession (ValidateSessionRequest) returns
(ValidateSessionResponse) {
        option (multipass.credentials) = <retrieve>;
      }
  }
```

The validation of a secure session can be performed in a way substantially of the form:

```
message ValidateSessionRequest {
  optional bytes secure_session_request = 1;
  optional bytes frame = 2;
  optional SealedTicket ticket = 3;
}
```

Figure 6:
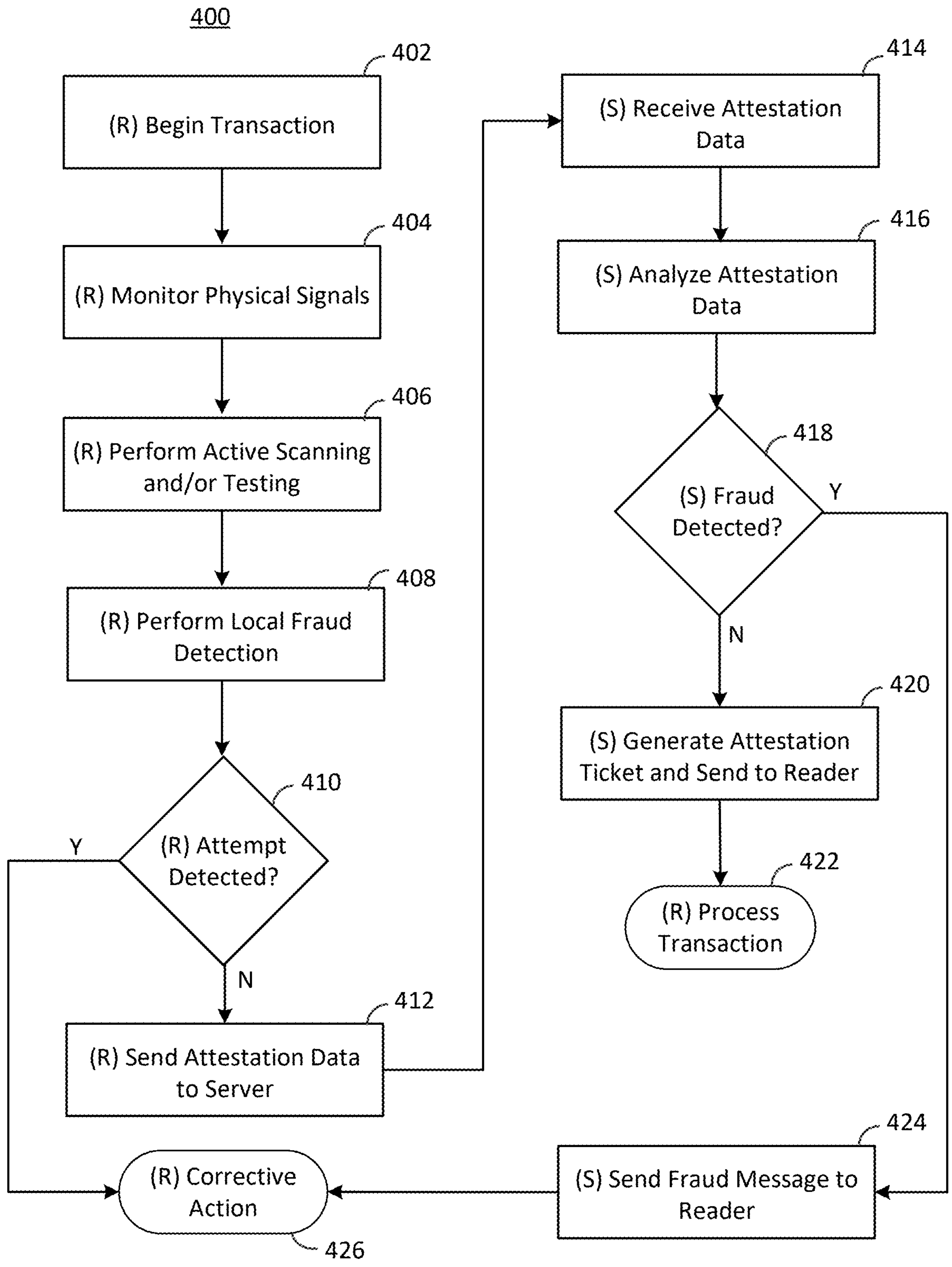
FIG. 6 depicts a non-limiting flow diagram illustrating exemplary methods for physical and logical detections for fraud and tampering in accordance with some embodiments of the present disclosure.
Figure 7:
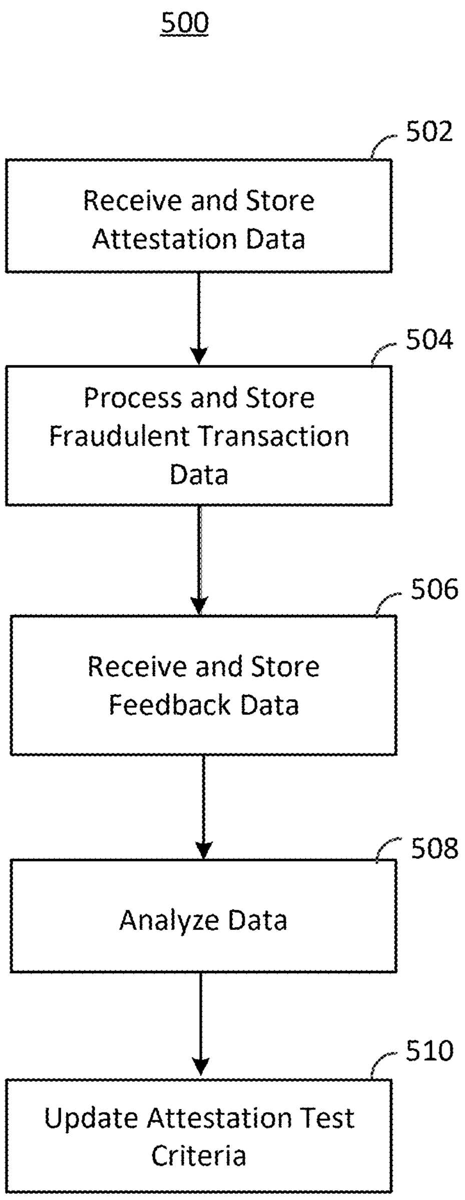
FIG. 7 depicts a non-limiting flow diagram illustrating exemplary methods for updating test criteria in accordance with some embodiments of the present disclosure.

In view of the structures and devices described supra, methods that can be implemented in accordance with the disclosed subject matter will be better appreciated with reference to the flowcharts of FIGS. 6-7. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts steps 400 for performing physical and logical detection of fraudulent transactions and tamper attempts in accordance with some embodiments of the present disclosure. In one embodiment, as is depicted in FIG. 6, steps 400 are performed by a payment terminal device such as a payment object reader 22 (indicated with an (R) in FIG. 6) and a payment processing system 50 of a payment server 40 (indicated with a(S) in FIG. 6). Although these steps are described as being performed by particular devices in one embodiment, it will be understood that the allocation of the steps between the devices may be modified in any suitable manner or that the number of devices performing the steps may be modified in any suitable manner.

At step 402, processing unit 120 of payment object reader 22 may begin a payment transaction with a payment object 10, such as a NFC device 12 or an EMV chip 14. In some embodiments (not depicted in FIG. 6) the remaining steps of FIG. 6 may be performed even when a transaction has not been initiated. In this manner, it may be possible to check for tamper attempts even when transactions are not being processed. Once a payment transaction has been initiated at step 402, processing may continue to step 404.

At step 404, processing unit 120 of payment object reader 22 may monitor physical signals based on the attestation routine 138, where the attestation routine 138 is obtained from a payment processing system, like payment processing system 50. Although any suitable physical signals may be monitored in any suitable manner, in some embodiments monitoring components such as NFC monitoring component 142, contact monitoring component 144, power supply monitoring component 146, and chip card detection component 148 may be monitored as described herein. In some embodiments, signals may be provided to one or more monitoring components, such as a test waveform. Although these monitored physical signals may be used to determine any suitable information, in some embodiments electrical characteristics, detection signals, and monitored timing may be determined based on the monitored physical signals. Processing may then continue to step 406.

At step 406, processing unit 120 of payment object reader 22 may perform active testing based on the attestation routine 138. Although any suitable active testing may be performed in accordance with the present disclosure, in some embodiments active testing may include providing signals and messages, such as request messages (e.g., random number test requests, error condition test requests, and message timing test requests). Based on the responses received from the payment device, and in some embodiments other signals (e.g., electrical characteristics and timing information), information such as monitored responses and monitored timing may be obtained. Processing may then continue to step 408.

At step 408, processing unit 120 of payment object reader 22 may perform local fraud and tamper detection based on the attestation routine 138. Although fraud and tamper detection may be performed locally in any suitable manner, in some embodiments the information gathered in steps 404 and 406 may be analyzed in accordance with local test criteria. Processing may then continue to step 410, in which it is determined from the analysis at step 408 whether a fraudulent transaction or tamper attempt has been detected, such that the payment object reader 22 should take corrective action immediately, in which case processing may continue to step 426. In some embodiments as depicted in FIG. 6, if the local test criteria do not indicate that corrective action should be taken immediately, processing may continue to step 412. However, it will be understood that in some embodiments (not depicted in FIG. 6), processing may only continue to step 412 if the local test criteria indicate that a suspicious transaction (e.g., that does not require immediate corrective action) has occurred.

At step 412, processing unit 120 of payment object reader 22 may send information to a server based on the attestation routine 138. Although any suitable information may be sent to any suitable server, in some embodiments payment object reader 22 may send a server request message to a payment processing system 50 of a payment server 40 via merchant device 29 and network 30. Although it will be understood that any suitable information may be provided in the server request message, in some embodiments the information may include monitored electrical characteristics, monitored timing, monitored responses, transaction information, information about the payment terminal (e.g., location, etc.), environmental information (e.g., temperature, etc.), statistics determined therefrom, and preliminary assessments based on local test criteria. Processing may then continue to step 414.

At step 414, processing unit 302 of payment processing system 50 may receive the information (e.g., the server request message) via communication interface 310 based on operating instructions 320 and attestation routine 324. The received information (e.g., monitored electrical characteristics, monitored timing, monitored responses, transaction information, information about the payment terminal (e.g., location, etc.), environmental information (e.g., temperature, etc.), statistics determined therefrom, and preliminary assessments based on local test criteria) may be extracted from the server request message for processing by the payment processing system 50. Processing may then continue to step 416.

At step 416, processing unit 302 of payment processing system 50 may analyze the received information based on the attestation routine 324. In some embodiments, the received information may be analyzed using server test criteria and based on other sources of information, such as previously stored information from the same payment terminal 20 (e.g., payment object reader 22 of payment terminal 20), from the same payment object 10, from other payment terminals, and from other payment devices. The received information may also be analyzed based on other transactions that are happening concurrently. The received information may also be stored, such as in transaction database 330. Processing may then continue to step 418.

At step 418, processing unit 302 of payment processing system 50 may determine whether a fraudulent transaction or tamper attempt has been detected based on the attestation routine 324. As described herein, in some embodiments the received information may be analyzed based on the server test criteria, information stored in the transaction database 330, and concurrent payment transactions. If it is determined that a fraudulent transaction or tamper attempt has occurred, processing may continue to step 424. If it is determined that a fraudulent transaction or tamper attempt has not occurred, processing may continue to step 420.

At step 420, processing unit 302 of payment processing system 50 may send a message to the payment terminal 10 indicating that the transaction should be processed, based on the operating instructions 320, the payment processing instructions 322, and attestation routine 324. In some embodiments, payment processing system may communicate with one or more servers such as a transaction server 60, process the transaction, generate an approval message indicating that the transaction has been approved and including information regarding the processed transaction, and transmit the message to payment object reader 22 via network 30 and merchant device 29. Processing may then continue to step 422.

At step 422, processing unit 120 of payment object reader 22 may process the transaction based on the approval message and the transaction processing instructions 132. Once the transaction has been processed, the processing of steps 400 may end.

At step 424, processing unit 302 of payment processing system 50 may generate and send a message such as a fraud determination message to a payment terminal 20 (e.g., payment object reader 22) based on the operating instructions 320 and the attestation routine 324. In some embodiments, the fraud determination message may include information such as an indication that a fraudulent transaction or tamper attempt is occurring, information about the type of fraudulent transaction or tamper attempt, and instructions regarding a type of corrective action to perform. Processing may then continue to step 426.

At step 426, processing unit 120 of payment object reader 22 may take corrective action based on the attestation routine 138. As described herein, the processing of step 426 may occur based on a determination at either the payment object reader 22 (e.g., based on local test criteria) or the payment processing system 50 (e.g., based on server test criteria, concurrent transactions, and data stored in transaction database 330). The payment object reader may then take appropriate corrective action (e.g., aborting a transaction, temporarily or permanently removing power or disabling one or more components of the payment terminal, querying the payment device to gather additional information, or employing countermeasures), as described herein. The processing of steps 400 may then end.

FIG. 7 depicts a non-limiting flow diagram illustrating exemplary steps 500 for updating test criteria in accordance with some embodiments of the present disclosure. Although it will be understood that test criteria may be updated in any suitable manner and by any suitable devices, in an exemplary embodiment test criteria may be updated at payment processing system 50 of payment server 40 based on information received from payment object readers 20.

At step 502, processing unit 302 of payment processing system 50 may receive and store reader data based on operating instructions 320 and attestation routine 324. In some embodiments, payment processing system 50 may receive server request messages from payment object readers 20. Those server request messages include information that is then stored in transaction database 330, such as monitored electrical characteristics, monitored timing, monitored responses, transaction information, information about the payment terminal (e.g., location, etc.), environmental information (e.g., temperature, etc.), statistics determined therefrom, and preliminary assessments based on local test criteria. Processing may then continue to step 504.

At step 504, processing unit 302 of payment processing system 50 may process server request messages to determine whether a fraudulent transaction or tamper attempt has occurred, and store information about that determination at transaction database 330, based on attestation routine 324. As described herein, payment processing system 50 may process received server request messages such as is depicted and described at steps 414-420 and step 424 of FIG. 6. The results of this processing (e.g., the results of the testing against server test criteria) may be associated with the reader data and stored at transaction database 330. Processing may then continue to step 506.

At step 506, processing unit 302 of payment processing system 50 may receive feedback and store the feedback at transaction database 330 based on attestation routine 324. Although any suitable feedback may be received and stored in accordance with the present disclosure, in some embodiments false positives and false negatives may be received and associated with transactions in transaction database 330. Feedback may also include externally updated test criteria, which may be used in step 508 and 510 to analyze data and update test criteria based on the information stored at the transaction database 330.

At step 508, processing unit 302 of payment processing system 50 may analyze the data in transaction database 330 based on attestation routine 324. In some embodiments, machine learning techniques may be utilized on the large datasets of transaction database 330, and in some embodiments, the externally updated test criteria. In some embodiments, patterns that result in fraudulent transactions may be identified based on the information stored at transaction database 330, and test criteria may be updated based on the identification. False positives and false negatives may be used to identify test criteria that should be modified. Information such as the severity of fraudulent transactions and tamper attempts or the likelihood that particular information (e.g., electrical characteristics, monitored responses, monitored timing, payment object reader information, environmental information, etc.) resulted in a fraudulent transaction or tamper attempt may be used to determine which test criteria should be local test criteria and which test criteria may be server test criteria, as well as the type of corrective action that should be taken. Once the data is analyzed, processing may continue to step 510.

At step 510, processing unit 302 of payment processing system 50 may update test criteria based on attestation routine 324. In some embodiments, server test criteria may be updated at the payment processing system 50 and local test criteria may be updated by transmitting an update message to payment object reader 22 via network 30 and merchant device 29. Processing of steps 500 may then end.

Figure 8A:
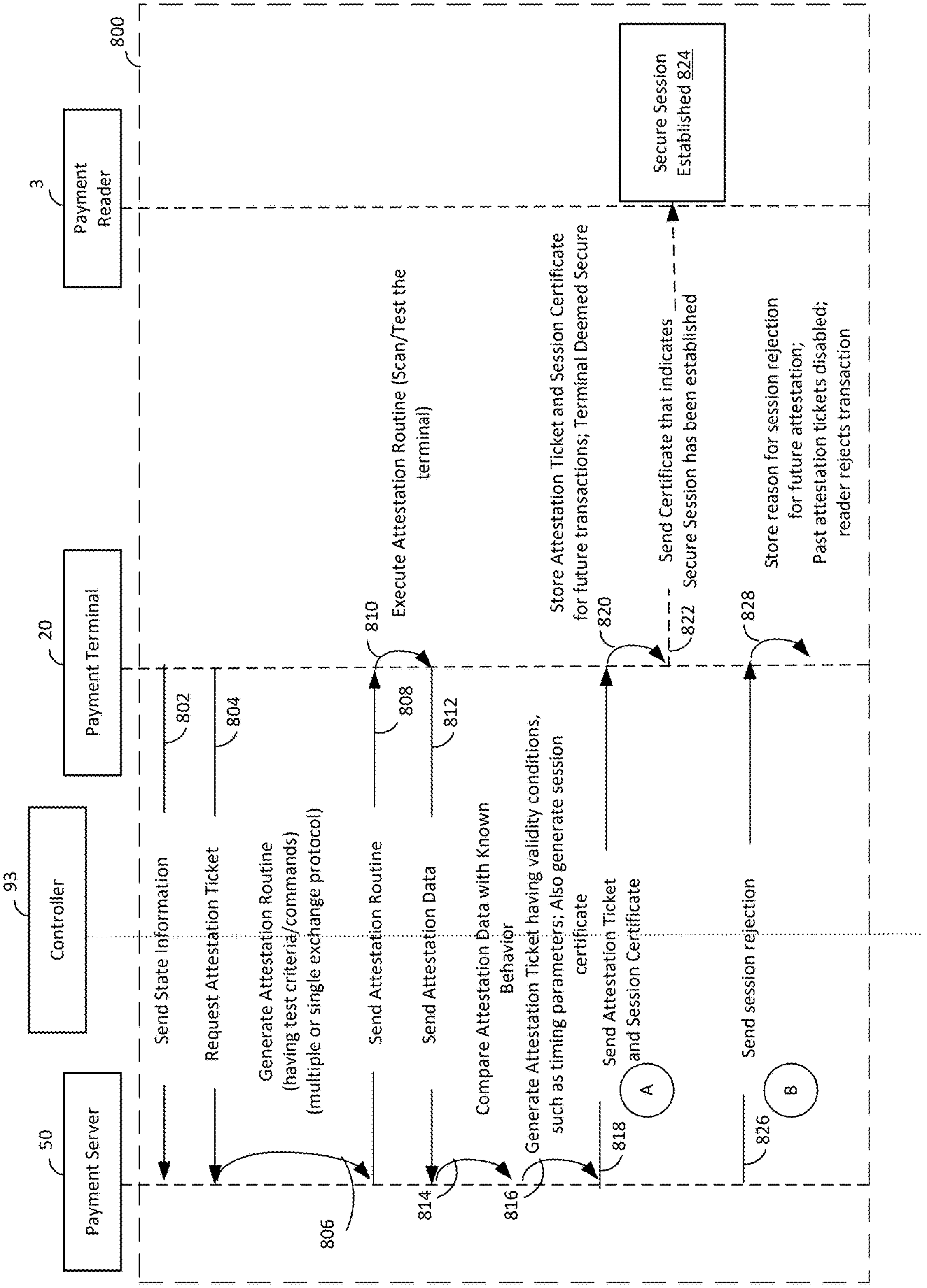
FIGS. 8A-8D depict non-limiting flow diagram illustrating exemplary methods for physical and logical detections for fraud and tampering for attesting security of a device, establishing a secure communication channel, and validating a session between the device and a reader in accordance with some embodiments of the present disclosure.

FIG. 8A depicts a data flow 800 for generating an attestation ticket validating a payment terminal or any other merchant device belonging to the merchant and also for establishing a secure session between an attested terminal and a payment object reader, in accordance with some embodiments of the present disclosure. In one embodiment, as is depicted in FIG. 8, steps 800 are performed by a payment terminal device such as a payment reader 3, a payment terminal (also referred to as merchant device) 20, and payment server 50 (i.e., by payment processing system 50). Although these steps are described as being performed by particular devices in one embodiment, it will be understood that the allocation of the steps between the devices may be modified in any suitable manner or that the number of devices performing the steps may be modified in any suitable manner. Furthermore, method 800 can apply to a ticket being generated for the first time with no prior history of attestation tickets to the payment device's name, and also for devices requesting attestation tickets to be updated.

At step 802, the payment terminal 20, for example, the tamper monitoring component 70 periodically uploads data about state of the device on which it is installed (for example, hardware/OS details, signs of jailbreak or malware, device characteristics, etc.). The payment server 50 (for example, the tamper detection component 80) may receive and store that data. Collecting the state data allows the disclosed system to make better decisions about which platforms (application installs, devices, etc.) are trusted and secure. The state data also reveals all past ticket information, server's past decisions, whether the merchant has a good risk standing, any past indication of tampering or jail-breaking, transaction or merchant history and information related to that particular device or application. If this is the first time a device or application is requesting to be validated or attested, such data may not be available and as such the state data may be void. Therefore, for the purposes of this description, this step may occur either as first step or a step after attestation. In some cases, step 804 makes step 802 redundant and only one of the two is performed. In other cases, both steps are performed, where step 802 focuses on housekeeping and ensuring the state data is always up-to-date but an explicit request for attestation is not made, while step 804 triggers the process of generating an attestation ticket for validating a payment device. It will be understood that any number of devices, applications, operating platforms, merchants, and objects can be attested.

The tamper monitoring component 70 periodically checks in with payment server 50 and runs a thorough set of scans and tests on the payment terminal 20 to determine whether it is a candidate of a valid attestation ticket. This is also referred to as a "periodic scan". An example HTTP endpoint can be of the form "/frame/upload" to request for attestation routines and exchange data over encrypted channels. Here, frame refers to attestation data and routines. Besides, request for attestation ticket, the request can also include request for secure session validation. In some cases, the request for session validation can be sent after the ticket has been generated and received by the payment terminal 20. An example HTTP endpoint can be of the form "/session/validate." When a reader 3 is plugged in, the tamper monitoring component 70 runs a reduced set of checks, and then payment terminal's application 25 checks with server's tamper detection component 80 to confirm that it is allowed to communicate with the reader 3. This is explained subsequently.

For the purpose of explanation and clarity, the description hereinafter focuses on attesting a device, particularly payment terminal 20 which is executing a payment application 25 which interacts with the payment device or reader 10.

At step 803, the payment terminal 20 detects an attestation trigger. For example, the payment terminal 20 can detect an interaction between its communication port with a reader 3. Other examples of attestation trigger includes, but are not limited to, pairing a new reader to the POS terminal, installing a payment application to an unknown device, detecting re-location of the reader or the POS terminal to a new location, for example known to be fraudulent, detecting insertion of a card from a fraudulent user, detecting a fraudulent card, detecting entry of a fraudulent device within an established geo-fence, and so on. As such, the attestation ticket can attest not just the platform but also the environment, such as the location where the merchant store is, the customers or payment objects or payment devices (such as Apple Watch®) that enter a geo-fence. Clearly, while some attestation triggers may be merchant driven, others are initiated by an event occurring around or with respect to the payment terminal 20.

At step 804, the payment terminal 20 may send a request to the payment server 50 requesting to facilitate generation of attestation ticket with a plugged in reader 3. In response to an attestation trigger, for example, a reader 3 being plugged in, the payment terminal 20 generates a request for the payment server 50 to attest the payment terminal 20. Here, the "attestation trigger" is detection of connection with a reader 3, however the attestation triggers can vary or can be combination of several triggers. The tamper monitoring component 70 can send an attestation request (a) on startup, (b) whenever it has data to send, as shown in step 802, and (c) every few minutes; this gives server 50 regular opportunities to send new commands and attest as and when required.

In one implementation, the tamper monitoring component 70 can encrypt request for attestation ticket using keys under white-box cryptography. Additionally or alternatively, the tamper monitoring component 70 can apply HTTPS encryption and authentication, which is used by all endpoints to encode the request. The tamper monitoring component 70 sends the attestation ticket request over an encrypted and obfuscated communication protocol, also referred to as attestation protocol, based for example on HTTP. Herein, every request or data originating from the tamper monitoring component 70 can be expressed in the form of 'frames.'

At step 806, the server 50 receives the attestation ticket request (encoded, for example) and determines whether there is any data associated with it, for example, state data indicating whether there is any historical data on which the server 50 can rely. Additionally, the data may include environmental factors, device identifiers, or merchant identifiers based on which the server 50 can determine whether there are any conditions associated with it. One of the condition may be "never attest in offline mode" or "attest if the merchant has a good standing," or attest if the merchant's account meets a certain criteria, and so on. Accordingly, the server 50 generates attestation routines for the terminal to execute. The attestation routines can include commands/test criteria or a single command that specify with granularity one or more anti-tamper checks, data collection scans, and/or tests, that tamper monitoring component 70 performs on the payment terminal 20. The policy of what commands are sent and under which circumstances can be encoded in tamper detection component 80. In one example, the attestation routines can be fixed such that regardless of what terminal is being tested the same routines are sent out, may be in different order. In other examples, the attestation routine can be based on the type of the terminal (iOS or Android), merchant profile, device profile, circumstances, and so on. In some cases, the order of commands in the routine can also be configured based on responses obtained from the tamper monitoring component 70. Therefore, the commands are sent in one after another, in a loop manner, so as to add unpredictability in the flow. For example, the second command to the terminal 20 is configured based on how the terminal 20 responds to the first command. In some variations, the commands are low-level queries and commands, for example by using a scripting language.

At step 808, the server 50 sends the attestation routines to the terminal 20. In some implementations, the request for an attestation ticket from Tamper monitoring component 70 is followed by a response from Tamper detection component 80 in the form of commands or attestation routine. In some other cases, a routine or command from Tamper detection component 80 is followed by a result from Tamper monitoring component 70.

At step 810, the tamper monitoring component 70 executes the attestation routine, that involve, for example scanning or testing the terminal 20. The attestation routine when implemented on the terminal can cause, for example, hashing a portion of a software code, scanning memory of the payment terminal, checking for jail-breaking of the software code, gathering metadata of a mounted file system, and so on.

At step 812, the tamper monitoring component 70 obtains data corresponding to the routines, also called persistent data or attestation data, encodes as frames and sends it to the server 50 for further processing. Since Tamper detection component 80 is mostly stateless, the state and all events related to the terminal are saved on the client side and kept opaque such that an attacker cannot access or make use of the data in any way. As mentioned above, at this time, the Tamper detection component 80 can request for additional information through more commands. As such steps 806-812 are repeated. Here, assume that only one cycle of commands is exchanged. The persisted data is written when Tamper monitoring component 70 receives a "set_persisted_data" command from Tamper detection component 80. There can be a persisted data file, which Tamper monitoring component 70 overwrites each time.

An attacker cannot read, modify, or forge the persisted/attestation data because it is encrypted, but it can be deleted at any time. This makes it useful for storing "favorable" data, such as "this device passed this set of checks". In some cases, "unfavorable" data, such as "tampering was detected on this client", since an attacker can always delete it. However, some cases can save the unfavorable data such as "lastDenyTimestamp."

In one example, the attestation data may include: a 4-byte integer encoding the protocol version; a 4-byte integer encoding the length of the next field; and a variable-length ciphertext blob. The ciphertext can be an encrypted JSON object to store other attributes like "ticket", which contains a ticket object. Whenever Tamper monitoring component 70 sends a frame to Tamper detection component 80, it includes the current attestation data in a persisted_data message shown in 812. When the format of the persisted data (or any of its elements) changes, the protocol version number increases. If Tamper detection component 80 receives attestation data with an out-of-date version, it ignores it and eventually overwrites it.

The persisted data can also be encrypted and authenticated using, e.g., AES-GCM with a 128-bit key. In one embodiment, encryption and decryption happen on the server side; as the attestation data is completely opaque to clients. All servers use the same key, which is stored and provided by a key-management system (not shown).

If tamper detection component 80 fails to decrypt the persisted data (e.g., because the MAC is bad), it discards it as if the protocol version had been out-of-date. The bad MAC can also be used as a signal of tampering.

At step 814, the server 50 compares encoded attestation data with known behavior or by basing it on reliably measured data collected over a population of payment platforms or pre-set values determined by security experts. If the data matches, the server 50 generates an attestation ticket validating that the terminal 50 is secure. If the data does not much, the ticket is denied and the tamper monitoring component 70 is notified. In this case, the tamper monitoring component 70 can re-submit the request after some time. As mentioned before, a ticket is a summary of the checks that have been run on a given device and that have returned successful or expected responses. It may include two types of information: timestamps and client identifiers. The timestamps indicate the last time a particular type of event occurred for a device and can track various types of events: "deny" and "approve". A "deny" can happen anytime tamper detection component 80 sees a command result indicating a problem. An "approve" happens when Tamper detection component 80 has no further commands to send and has not had a "deny" event. In one exemplary implementation, timestamps are in seconds past the epoch, using the server's clock.

Client identifiers are strings identifying a particular device. Tamper monitoring component 70 sends up a set of device identifiers with every frame; the exact set depends on the platform. "Device identifiers" to refer to the raw data that Tamper monitoring component 70 sends up, and "client identifiers" to refer to the set of features extracted by Tamper detection component 80. Client identifiers can also be extracted from the HTTP headers associated with tamper monitoring component 70's message (although these may be easier to tamper with).

Every frame tamper monitoring component 70 sends has a set of device identifiers. If the client has any persisted data, there will be a persisted_data message as well. Thus, tamper detection component 80 can always see Tamper monitoring component 70's previous ticket, if any. During the communications process, if tamper detection component 80 encounters an "approve" or "deny" event, it updates the current ticket and sends to back to the client with a 'set_persisted_data' command. By the end of the communications process, tamper detection component 80 must have encountered at least of these two events: either it encountered a problem ("deny"), or it finished all of its checks with no problem ("approve").

At step 816, the tamper detection component 80 of server 50 (a companion of the tamper monitoring component 70) generates the attestation ticket. In other implementations, tamper detection component 80 receives encoded request for attestation ticket from tamper monitoring component 70 and then sends to another component within the server 50, for example crypto 95 for decoding and subsequently, generate tickets. This is further discussed in FIG. 8D. For this implementation, the tamper detection component 80 generates the attestation ticket, specifically for the terminal requesting the ticket. In some implementations, the tamper detection component 80 generates tickets only when the request, including state data and other data, when compared to the population of devices, indicates an anomaly. As an example, the ticket can be substantially of the form:

{"lastApproveTimestamp": 189457984,
"lastDenyTimestamp": 144387587585,
"clientId": {
"id_OS_card_data": "\"vdjfhgiug==\"",
"id_OS_ro_serialno": "\"HLOIO\"",
"id_header_installation": "\"ioreutioreut\"",
"id_OS_ro_boot_serialno": "\"retoirtoerit0\""}}

Accordingly, the tamper detection component 70 generates an attestation ticket as shown in step 816. In other implementations, the ticket is only generated in an approve scenario. The tamper detection component 80 can also apply validity conditions on the attestation ticket, besides expiration and duration of time. For example, the attestation ticket may only attest a portion of the terminal 20, for a certain application, or for a certain type or number of transactions and such conditions can be set on the ticket. The attestation ticket and the state/attestation data can be re-sent to the tamper detection component 70 as shown in step 818. At this step, using the data sent by the monitoring component, the server can also generate a session certificate to set up a secure session between the requesting device and a connected reader.

At step 820, the attestation data and/or ticket can be stored in a secure database, for example a Hadoop Distributed File System (HDFS). After incorporation of the attestation routine, the payment server 50 assigns the payment platform as trusted for a predetermined period of time and assigns an attestation ticket for all future interactions. Additionally, it can also generate a session certificate for establishing secure sessions. At the lapse of the time period, the attestation routine can be re-initialized and re-executed to attest the payment platform for the second time.

At step 822, the attestation ticket can also accompany a session certificate to indicate a session has been established and/or validated, in one embodiment. In another embodiment, a separate session certificate can be requested through a separate process described subsequently. When the user plugs in a reader 3, the validation process is initiated. Tamper monitoring component 70 role in this process is to run a smaller set of checks, then put together a frame containing (a) the results of those checks, (b) data identifying the device it's running, and (c) the data that was written by the last set_persisted_data command. This frame is attached to the session validation request and sent to Tamper detection component 80's session/validate endpoint.

When evaluating this session validation request, tamper detection component 80 decrypts the ticket and checks that (a) tamper monitoring component 70 performed the communications process recently, (b) no problems were found, and (c) the process was run on the same device that the current validation process is running on.

Along with its other checks at the time of attestation, tamper detection component 80 can also extract the ticket from the persisted data and attempt to validate a secure session for a connected reader or any future connections with other devices. Like other checks from tamper detection component 80, the ticket validation process is configurable. Any of the following reasons can cause a session to be denied: no ticket the ticket has no "lastApproveTimestamp"; the ticket has a present; "lastApproveTimestamp", but it may be far in the past; the ticket has a "lastDenyTimestamp"; the client identifiers in the ticket do not match the ones in the current frame; certain mandatory client identifiers are missing from the ticket, the reader may not be connected or connected right, the reader may be connected to the incorrect port, a fraudulent object, user or buyer device may be detected in a geo-fence and so on. If, however, the session cannot be validated as shown in step 826, the payment terminal can store the reason of denial in the ticket and update any component that may need updating as done in step 828.

Figure 8B:
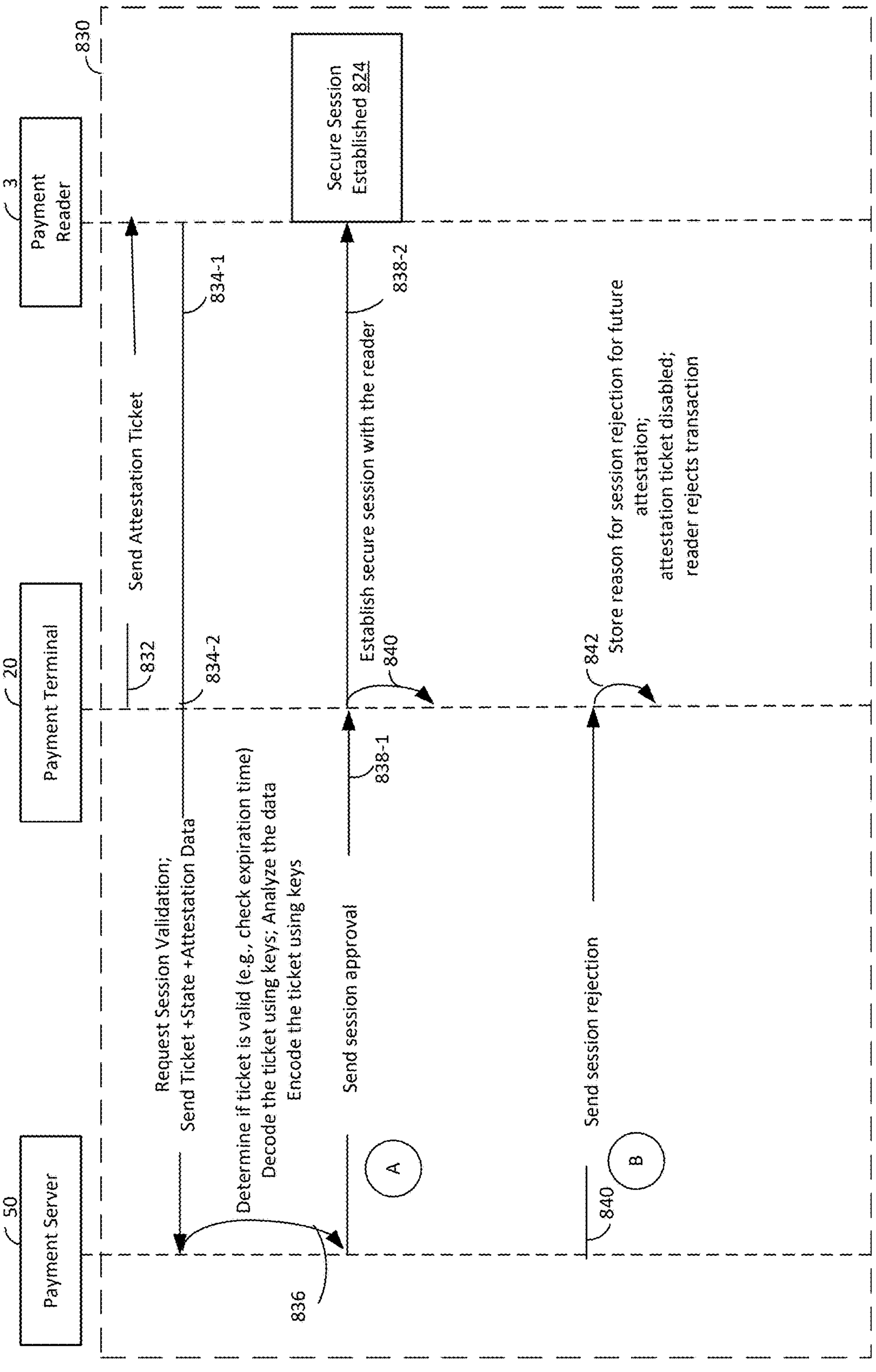

FIG. 8B depicts a data flow 830 for establishing a secure session between an attested terminal and a payment object reader, in accordance with some embodiments of the present disclosure. In one embodiment, as is depicted in FIG. 8B, steps 830 are performed by a payment terminal device such as a payment reader 3, a payment terminal (also referred to as merchant device) 20, and payment server 50 (i.e., by payment processing system 50). Although these steps are described as being performed by particular devices in one embodiment, it will be understood that the allocation of the steps between the devices may be modified in any suitable manner or that the number of devices performing the steps may be modified in any suitable manner. Furthermore, method 830 can apply to a ticket being generated for the first time with no prior history of attestation tickets to the payment device's name, and also for devices requesting attestation tickets to be updated.

At step 832, the payment terminal 20 may send a previously assigned attestation ticket on detection of a connection made with the reader 3. Optionally, just the detection of connection or a re-start or any other trigger, for example, similar to attestation trigger, can initiate the process of establishing a secure session between the reader and the terminal. In one example, a secure session allows a secure exchange of information between two devices. At that time, the reader 3 can request session approval to ensure the terminal 20 is not tampered with. Other triggers can cause the reader 3 to receive attestation tickets from the payment terminal. The reader 3 may do this validation process once and not request for a session approval for the duration of its validity. In some examples, the validity of secure session expires as soon as reader 3 is disconnected or otherwise made unavailable for this could indicate switching of terminal 20 from a trusted device to an untrusted one.

At steps 834-1 and 834-2, the reader 3 can receive a previously assigned attestation ticket from the payment terminal 20 in response to payment transactions to prove that the terminal has not been tampered with or is otherwise associated with security threats. The reader 3 can also receive a public key from terminal 20 and a frame summarizing the state of the device that terminal 20 is running on. The terminal's frame can also contain data saved from previous interactions with the attestation endpoint. This data is encrypted by payment server 50, stored on the client device, and sent back to server in the frame at the time of session validation.

The reader 3 can decode at least a portion of the ticket to determine where it should be send and other basic information, such as expiration time, last_deny_timestamp. In some implementations, the reader 3 can take local decisions based entirely on the portion of data it can read. For example, in offline mode, the reader 3 can choose to reject the validity of an otherwise valid attestation ticket to reduce the risks associated with it. In other implementations, the reader 3 sends the attestation ticket to a payment server 50 for verification and so that the payment server 50 can provide a further session approval. The contents of the attestation ticket have been described with respect to step 816. However, this attestation ticket may include modified and encoded information pertaining to reader type, time when the session was requested, type of transaction, type of connection between the reader and the terminal, history of transactions associated with the terminal, and so on, appended by the reader 3. Such information can also include a reader identifier or security certificate provided by the payment server 50 at the time of manufacturing. In other examples, the attestation tickets are encrypted and completely opaque to the reader 3 and terminal 20. Since they are only valid for a limited period of time, this means the client cannot tell whether their ticket has expired or not. Partly because of this, clients may apply for session validation without having acquired a recent ticket, forcing the server to give either spurious approvals or spurious denials. In some cases, the reader 3 can send the request to the payment terminal 20 which then sends it to the payment server 50, as shown in steps 834-1 and 834-2.

At step 836, the reader 3 sends the session request to the payment server 20. At step 838, the payment server 20 determines whether the received ticket from reader 3 is valid and further analyzes the ticket to determine if there are any other conditions associated with it that prevent approval of a secure session. In some examples, the reader 3 sends the ticket to the tamper detection component 80. The tamper detection component 80 then sends the ticket to a cryptographic component (crypto) 95, which in combination with HSM 98 and the specialized keys provided, decrypts the ticket. The keys are compared with the keys of the terminal 20 and reader 3 embedded in the ticket, for exampling through HMACs. A keyed-hash message authentication code (HMAC) is a specific type of message authentication code (MAC) involving a cryptographic hash function (hence the 'H') in combination with a secret cryptographic key. It will be understood that other techniques may be also be used.

In one example implementation, crypto 95 decodes the "secure_session_init" request from the reader 3 and provides the contents to tamper detection component 80. This includes checking the message's HMACs using keys stored in HSM 98. The tamper detection component 80 determines whether terminal 20 is running in a safe environment. To do this, it uses information from the decoded request, the frames from reader 3 (attestation data), and any stored information such as blacklists or whitelists. Assuming tamper detection component 80 has decided to approve the secure session, it selects a maximum duration and transaction count for the session and has crypto 95 encode an approval message. This message is also encoded using keys in HSM 98.

At steps 838-1 and 838-2, the encoded session approval is sent to the payment terminal and/or reader 3 and a secure session is established between the reader 3 and the terminal 20 for current and future transactions as shown in step 840. The server 20 does not have to check attestation as long as the session is validated and secured.

There are implementations where the session may be invalidated by the terminal 20 and/or crypto 95 after analysis as done in step 842. The denial of session request can then be sent to the terminal 20 and/or reader 3 for storage and also for the reader 3 to reject all payment transactions.

Figure 8C:
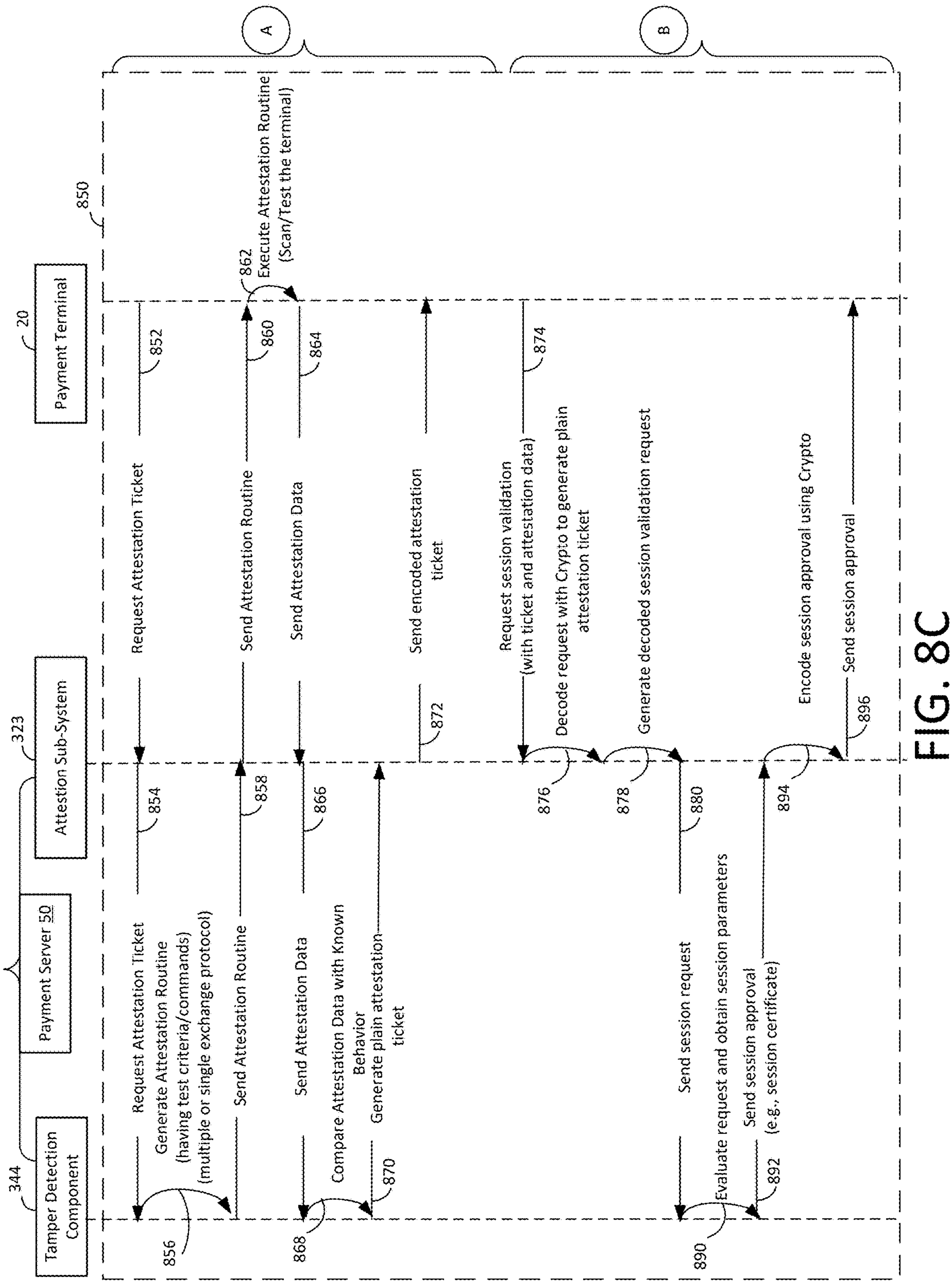

FIG. 8C depicts a data flow 850 for generating an attestation ticket validating a payment terminal or any other merchant device belonging to the merchant and also for establishing a secure session between an attested terminal and a payment object reader using a failover arrangement, in accordance with some embodiments of the present disclosure. In one embodiment, as is depicted in FIG. 8C, steps in process 850 are performed by a payment terminal device such as a payment reader 3, a payment terminal (also referred to as merchant device) 20, and payment server 50 (i.e., by payment processing system 50). Although these steps are described as being performed by particular devices in one embodiment, it will be understood that the allocation of the steps between the devices may be modified in any suitable manner or that the number of devices performing the steps may be modified in any suitable manner. Furthermore, method 850 can apply to a ticket being generated for the first time with no prior history of attestation tickets to the payment device's name, and also for devices requesting attestation tickets to be updated.

As described herein, after the tamper monitoring component 70 scans a device, the server 50 generates a (limited-time) ticket that is stored on the device. At secure session validation time, server 50 can examine the ticket instead of re-running those checks. Thus, the tamper detection component 50 tasks are split into two parts: The ticking part provides the same public endpoints as before, but the only work it performs is to create and validate tickets attesting that a device has been scanned by tamper monitoring component without problems. This is performed by the attestation sub-system 323, for example. The work of directing and evaluating the scans is forwarded to the validation logic stored in the tamper detection component 344. If the tamper detection component 344 goes down, the front part can "fail open" by pretending that the tamper detection component 344 approves all devices. This means there will be some periods where the security may be disabled; however, these periods will be conspicuous and not under an attacker's control. In other implementations, there may be a plurality of tamper detection component 344 stored across various locations so that when one fails, the other takes over. In this sense, the failover system is high availability and stateless, increases the velocity of generating attestation tickets while decreasing the risk for the validation process Both ticket creation and ticket validation can be high-availability. This is because tamper detection is where tickets are created, and if it goes down, then some clients will fail to get tickets. When those clients try to get secure sessions, the session validation component may not know whether the missing ticket is because of server failure or because of malicious activity. This is the reason system always be able to create tickets, even if the tamper detection component is not working. In other examples, one or the other may be high availability. The duration of the sessions can be made indefinite in some cases, based on risk, in case the detection logic is down for extended periods of time.

Going back to the figure, at step 852, the payment terminal 20 through the tamper monitoring component 70 periodically checks in with payment server 50 and runs a thorough set of scans and tests on the payment terminal 20 to determine whether it is a candidate of a valid attestation ticket. This is also referred to as a "periodic scan". An example HTTP endpoint can be of the form "/frame/upload" to request for attestation routines and exchange data over encrypted channels. Here, frame refers to attestation data and routines. Besides, request for attestation ticket, the request can also include request for secure session validation. In some cases, the request for session validation can be sent after the ticket has been generated and received by the payment terminal 20. An example HTTP endpoint can be of the form "/session/validate." When a reader 3 is plugged in, the tamper monitoring component 70 runs a reduced set of checks, and then payment terminal's application 25 checks with server's tamper detection component 80 to confirm that it is allowed to communicate with the reader 3. This is explained subsequently.

As shown in step 852, the request for an attestation ticket is sent to the attestation system 323 of the payment server 50, which then forwards it to the tamper detection component at step 854. The request at step 852 may be as a result of payment terminal 20 detecting an attestation trigger. For example, the payment terminal 20 can detect an interaction between its communication port with a reader 3. Other examples of attestation trigger includes, but are not limited to, pairing a new reader to the POS terminal, installing a payment application to an unknown device, detecting relocation of the reader or the POS terminal to a new location, for example known to be fraudulent, detecting insertion of a card from a fraudulent user, detecting a fraudulent card, detecting entry of a fraudulent device within an established geo-fence, and so on. As such, the attestation ticket can attest not just the platform but also the environment, such as the location where the merchant store is, the customers or payment objects or payment devices (such as Apple Watch®) that enter a geo-fence. Clearly, while some attestation triggers may be merchant driven, others are initiated by an event occurring around or with respect to the payment terminal 20.

At step 856, the tamper detection component 344 receives the attestation ticket request (encoded, for example) and determines whether there is any data associated with it, for example, state data indicating whether there is any historical data on which the tamper detection component 344 can rely. Additionally, the data may include environmental factors, device identifiers, or merchant identifiers based on which the tamper detection component 344 can determine whether there are any conditions associated with it. One of the condition may be "never attest in offline mode" or "attest if the merchant has a good standing," or attest if the merchant's account meets a certain criteria, and so on. Accordingly, the tamper detection component 344 generates attestation routines for the terminal to execute. The attestation routines can include commands/test criteria or a single command that specify with granularity one or more anti-tamper checks, data collection scans, and/or tests, that tamper monitoring component 70 performs on the payment terminal 20. The policy of what commands are sent and under which circumstances can be encoded in tamper detection component 344. In one example, the attestation routines can be fixed such that regardless of what terminal is being tested the same routines are sent out, may be in different order. In other examples, the attestation routine can be based on the type of the terminal (iOS or Android), merchant profile, device profile, circumstances, and so on. The merchant profile (merchant account information, inventory information, the demographic information, geographic location, bulk of purchase, the time lapsed between successive transaction, total amount earned, and the like) and customer profile (such as customer or merchant events, such as chargebacks (purchase transaction disputes), defaults, delinquencies, fraud, payment objects registered to the customer, device registered to the customer, customer preferences (e.g., uses credit card only), customer transaction history showing all transactions performed to the customer's name or payment object, and so on) can be saved either on the terminal or server, and in some instances, a certain subset can be saved on the reader, for example in a cache memory. The profile captures transaction history of the buyer and is representative of the buyer's purchase behavior (e.g., frequency) and interests. For example, if the buyer is a heavy purchaser of consumer electronics and sports accessories, categories "sports good" and "consumer electronics" may be assigned to the buyer. The buyer profile can also include buyer identifier associated with contactless payments, such as Apple Pay® or Google Wallet®. Such buyer identifiers may be sent to a buyer's phone after he or she registers for such options of contactless payments.

In some cases, the order of commands in the routine can also be configured based on responses obtained from the tamper monitoring component 70. Therefore, the commands are sent in one after another, in a loop manner, so as to add unpredictability in the flow. For example, the second command to the terminal 20 is configured based on how the terminal 20 responds to the first command. In some variations, the commands are low-level queries and commands, for example by using a scripting language.

At step 858, the tamper detection component 344 sends the attestation routines to the attestation system 323, which then forwards (e.g., after encrypting) to the terminal 20, as shown in step 860.

At step 862, the tamper monitoring component 70 executes the attestation routine, that involve, for example scanning or testing the terminal 20. The attestation routine when implemented on the terminal can cause, for example, hashing a portion of a software code, scanning memory of the payment terminal, checking for jail-breaking of the software code, gathering metadata of a mounted file system, and so on, and sends such data to the attestation system 323 at step 864, which then forwards to the tamper detection component 344 at step 866.

At step 868, the attestation system 323 obtains data corresponding to the routines, also called persistent data or attestation data, encodes as frames and sends it to the attestation system 323, which then forwards to the tamper detection component 344 for comparison. An attacker cannot read, modify, or forge the persisted/attestation data because it is encrypted, but it can be deleted at any time. This makes it useful for storing "favorable" data, such as "this device passed this set of checks". In some cases, "unfavorable" data, such as "tampering was detected on this client", since an attacker can always delete it. However, some cases can save the unfavorable data such as "lastDenyTimestamp."

In one example, the attestation data may include: a 4-byte integer encoding the protocol version; a 4-byte integer encoding the length of the next field; and a variable-length ciphertext blob. The ciphertext can be an encrypted JSON object to store other attributes like "ticket", which contains a ticket object. Whenever Tamper monitoring component 70 sends a frame to Tamper detection component 80, it includes the current attestation data in a persisted_data message shown in 812. When the format of the persisted data (or any of its elements) changes, the protocol version number increases. If Tamper detection component 80 receives attestation data with an out-of-date version, it ignores it and eventually overwrites it.

The persisted data can also be encrypted and authenticated using, e.g., AES-GCM with a 128-bit key. In one embodiment, encryption and decryption happen on the server side; as the attestation data is completely opaque to clients. All servers use the same key, which is stored and provided by a key-management system (not shown).

If tamper detection component 344 fails to decrypt the persisted data (e.g., because the MAC is bad), it discards it as if the protocol version had been out-of-date. The bad MAC can also be used as a signal of tampering.

At step 868, the tamper detection component 344 compares encoded attestation data with known behavior or by basing it on reliably measured data collected over a population of payment platforms or pre-set values determined by security experts. If the data matches, the server 50 generates an attestation ticket validating that the terminal 50 is secure at step 870, for example in a plain text format. If the data does not much, the ticket is denied and the tamper monitoring component 70 is notified through the attestation system 323. In this case, the tamper monitoring component 70 can re-submit the request after some time. As mentioned before, a ticket is a summary of the checks that have been run on a given device and that have returned successful or expected responses. It may include two types of information: timestamps and client identifiers. The timestamps indicate the last time a particular type of event occurred for a device and can track various types of events: "deny" and "approve". A "deny" can happen anytime tamper detection component 80 sees a command result indicating a problem. An "approve" happens when Tamper detection component 80 has no further commands to send and has not had a "deny" event. In one exemplary implementation, timestamps are in seconds past the epoch, using the server's clock.

Client identifiers are strings identifying a particular device. Tamper monitoring component 70 sends up a set of device identifiers with every frame; the exact set depends on the platform. "Device identifiers" to refer to the raw data that Tamper monitoring component 70 sends up, and "client identifiers" to refer to the set of features extracted by tamper detection component 80. Client identifiers can also be extracted from the HTTP headers associated with tamper monitoring component 70's message (although these may be easier to tamper with).

Every frame tamper monitoring component 70 sends has a set of device identifiers. If the client has any persisted data, there will be a persisted_data message as well. Thus, tamper detection component 80 can always see Tamper monitoring component 70's previous ticket, if any. During the communications process, if tamper detection component 80 encounters an "approve" or "deny" event, it updates the current ticket and sends to back to the client with a set_persisted_data command. By the end of the communications process, tamper detection component 80 must have encountered at least of these two events: either it encountered a problem ("deny"), or it finished all of its checks with no problem ("approve").

If tamper detection component 344 returns a ticket, the attestation system 323 wraps, encrypts, and signs it before returning it to the client 20 as shown in step 872. The tamper detection component 344 may returns a ticket in a plaintext data structure containing the device's approval status, an expiration date, and possibly some additional state. However, the ticket attestation system 323 return is mostly encrypted, and it contains the ticket in its ciphertext. Clients always get a ticket, even if the device is not approved; the device does not find that out until the session validation step.

If the tamper detection component 344 is unavailable, attestation system 323 creates an approved "emergency" ticket anyway. This ticket might have a shorter expiration time than normal.

At step 874, the payment terminal 20 can send a previously assigned attestation ticket, for example on step 872 or a previous one, on detection of a connection made with the reader 3. At that time, the reader 3 can request session approval to ensure the terminal 20 is not tampered with. Other triggers can cause the reader 3 to receive attestation tickets from the payment terminal. The reader 3 may do this validation process once and not request for a session approval for the duration of its validity. In some examples, the validity of secure session expires as soon as reader 3 is disconnected or otherwise made unavailable for this could indicate switching of terminal 20 from a trusted device to an untrusted one.

At step 876, the attestation system can decode the request, for example attestation system 323 *t* sends the ticket to a cryptographic component (crypto) 95, which in combination with HSM 98 and the keys provided, decrypts the ticket. The keys are compared with the keys of the terminal 20 and reader 3 embedded in the ticket, for exampling through HMACs. A keyed-hash message authentication code (HMAC) is a specific type of message authentication code (MAC) involving a cryptographic hash function (hence the 'H') in combination with a secret cryptographic key. It will be understood that other techniques may be also be used.

At step 878, the attestation system 323 generates the decoded session validation request and sends to the tamper detection component 344 at step 880. At 890, the tamper detection component 344 evaluates the request to obtain session parameters. When evaluating this session validation request, tamper detection component 344 checks that (a) tamper monitoring component 70 performed the communications process recently, (b) no problems were found, and (c) the process was run on the same device that the current validation process is running on. Assuming tamper detection component 344 has decided to approve the secure session, it selects a maximum duration and transaction count for the session and has crypto 95 encode an approval message. This message is also encoded using keys in HSM 98.

At steps 892, the encoded session approval is sent to the payment terminal and/or reader 3 and a secure session is established between the reader 3 and the terminal 20 for current and future transactions as shown in step 896 through the attestation system 323 that encodes the session approval using Crypto, for example. The server 20 does not have to check attestation as long as the session is validated and secured.

Figure 8D:
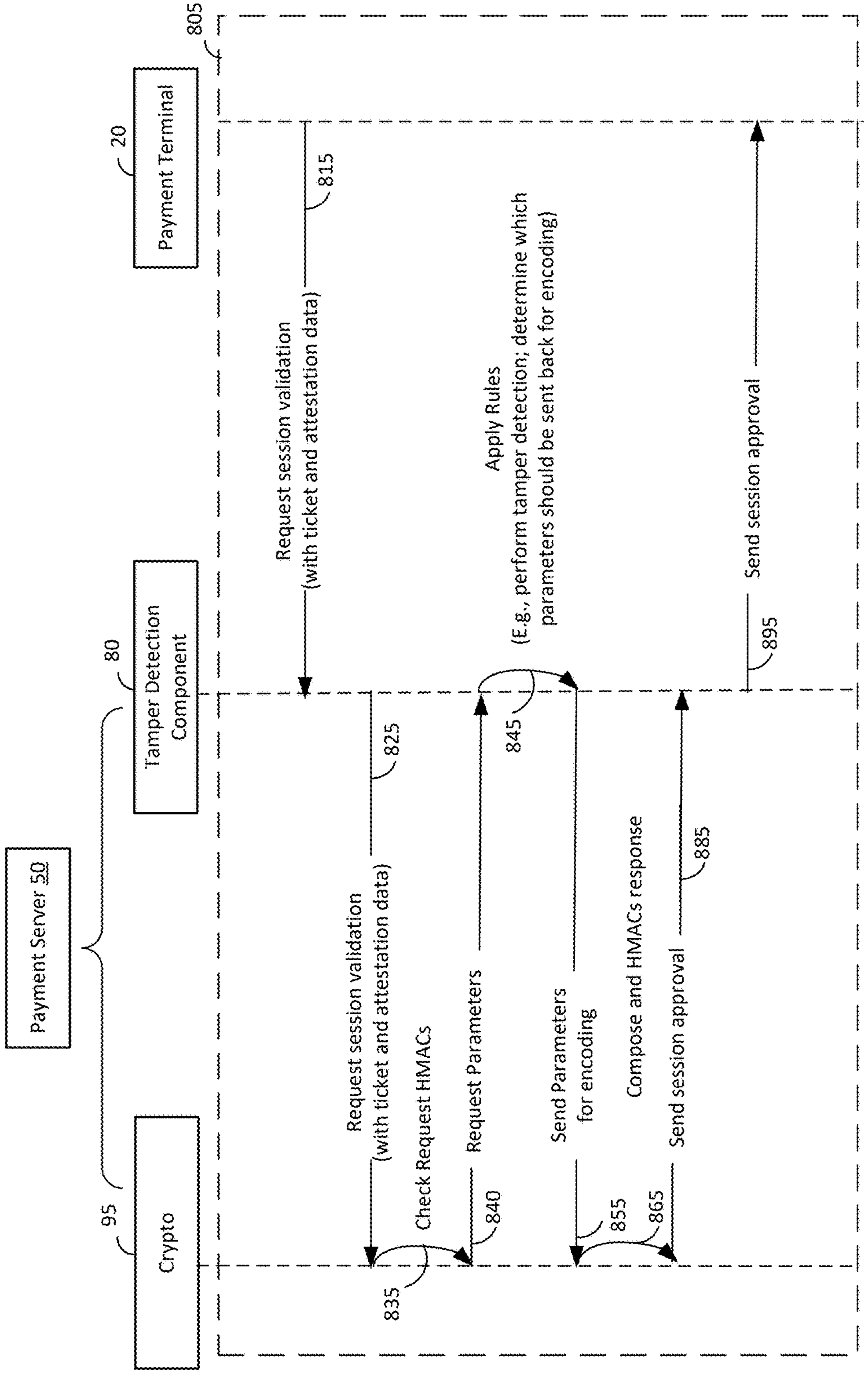

FIG. 8D depicts a data flow 805 for handling the attestation data in a secure manner within the payment server 50, in accordance with some embodiments of the present disclosure. In one embodiment, as is depicted in FIG. 8D, steps 805 are performed by a payment terminal device such as a payment reader 3, a payment terminal (also referred to as merchant device) 20, and payment server 50 (i.e., by payment processing system 50) having a tamper detection component 80 and a crypto 95 with HSM 98. Although these steps are described as being performed by particular devices in one embodiment, it will be understood that the allocation of the steps between the devices may be modified in any suitable manner or that the number of devices performing the steps may be modified in any suitable manner. Furthermore, method 805 can apply to a ticket being generated for the first time with no prior history of attestation tickets to the payment device's name, and also for devices requesting attestation tickets to be updated.

The payment terminal 20 can send a previously assigned attestation ticket on detection of a connection made with the reader 3. At that time, the reader 3 can request session approval to ensure the terminal 20 is not tampered with. Other triggers can cause the reader 3 to receive attestation tickets from the payment terminal. The reader 3 may do this validation process once and not request for a session approval for the duration of its validity. In some examples, the validity of secure session expires as soon as reader 3 is disconnected or otherwise made unavailable for this could indicate switching of terminal 20 from a trusted device to an untrusted one. The reader 3 can receive a previously assigned attestation ticket from the payment terminal 20 in response to payment transactions to prove that the terminal has not been tampered with or is otherwise associated with security threats. The reader 3 can also receive a public key from terminal 20 and a frame summarizing the state of the device that terminal 20 is running on. The terminal's frame can also contain data saved from previous interactions with the attestation endpoint. This data is encrypted by payment server 50, stored on the client device, and sent back to server in the frame at the time of session validation.

The reader 3 can decode at least a portion of the ticket to determine where it should be send and other basic information, such as expiration time, last_deny_timestamp. In some implementations, the reader 3 can take local decisions based entirely on the portion of data it can read. For example, in offline mode, the reader 3 can choose to reject the validity of an otherwise valid attestation ticket to reduce the risks associated with it. In other implementations, the reader 3 sends the attestation ticket to a payment server 50 for verification and so that the payment server 50 can provide a further session approval. The contents of the attestation ticket have been described with respect to step 816. However, this attestation ticket may include modified and encoded information pertaining to reader type, time when the session was requested, type of transaction, type of connection between the reader and the terminal, history of transactions associated with the terminal, and so on, appended by the reader 3. Such information can also include a reader identifier or security certificate provided by the payment server 50 at the time of manufacturing. In other examples, the attestation tickets are encrypted and completely opaque to the reader 3 and terminal 20. Since they are only valid for a limited period of time, this means the client cannot tell whether their ticket has expired or not. Partly because of this, clients may apply for session validation without having acquired a recent ticket, forcing the server to give either spurious approvals or spurious denials.

In some cases, the reader 3 can send the request to the payment terminal 20 which then sends it to the payment server 50.

Going back to the figure, at step 815, the reader 3 sends the session request to the tamper detection component 80. At step 825, the tamper detection component 80 forwards the request to the crypto 95. The tamper detection component 80 determines whether the received ticket from reader 3 is valid and further analyzes the ticket to determine if there are any other conditions associated with it that prevent approval of a secure session. In some examples, the reader 3 sends the ticket to the tamper detection component 80.

At step 835, the cryptographic component (crypto) 95, in combination with HSM 98 and the keys provided, decrypts the ticket. The keys are compared with the keys of the terminal 20 and reader 3 embedded in the ticket, for exampling through HMACs. A keyed-hash message authentication code (HMAC) is a specific type of message authentication code (MAC) involving a cryptographic hash function (hence the 'H') in combination with a secret cryptographic key. It will be understood that other techniques may be also be used.

In one example implementation, crypto 95 decodes the "secure_session_init" request from the reader 3 and provides the contents to tamper detection component 80. This includes checking the message's HMACs using keys stored in HSM 98. The tamper detection component 80 determines whether terminal 20 is running in a safe environment. To do this, it uses information from the decoded request, the frames from reader 3 (attestation data), and any stored information such as blacklists or whitelists. Assuming tamper detection component 80 has decided to approve the secure session, it selects a maximum duration and transaction count for the session and has crypto 95 encode an approval message. This message is also encoded using keys in HSM 98.

At step 840, the crypto requests for additional parameters from the tamper detection component 80. At step 845, the component 80 applies one or more rules to generate the parameters and sends it back to the crypto 95 at step 855. The rules can relate to tamper detection or extraction of specific parameters on which encryption is performed. The parameters are sent to step 855. Crypto composes the HMACs response at this time on the parameters at step 865 and sends the session approval at step 875 to the tamper detection component 80, which then forwards it to the terminal 20 at step 895. The encoded session approval is sent to the payment terminal and/or reader 3 and a secure session is established between the reader 3 and the terminal 20 for current and future transactions as shown in step 840. The server 20 does not have to check attestation as long as the session is validated and secured. There are implementations where the session may be invalidated by the terminal 20 and/or crypto 95 after analysis as done in step 842. The denial of session request can then be sent to the terminal 20 and/or reader 3 for storage and also for the reader 3 to reject all payment transactions.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method comprising:

receiving, at a payment server and from a payment terminal of a merchant, attestation data based at least in part on execution of an attestation routine comprising test criteria;

based at least in part on the attestation data and payment transaction data corresponding to a payment transaction conducted at the payment terminal, determining, by the payment server, a first indication of fraud associated with the payment transaction or a first indication of a tamper attempt associated with the payment transaction;

receiving, by the payment server, a second indication, wherein the second indication indicates an improper denial or improper acceptance of the payment transaction;

based at least in part on the first indication and the second indication, updating, by the payment server, the test criteria to updated test criteria; and generating, by the payment server, an updated attestation routine comprising the updated test criteria.

2. The method of claim 1, further comprising:

generating, by the payment server, the attestation routine in response to receiving an initial request from the payment terminal to attest the payment terminal; and sending, by the payment server, the attestation routine to the payment terminal, wherein receiving the attestation data is responsive to sending the attestation routine.

3. The method of claim 2, further comprising:
after generating the updated attestation routine, receiving, by the payment server and from the payment terminal, a second request from the payment terminal to attest the payment terminal; and
responsive to receiving the second request, sending, by the payment server, the updated attestation routine to the payment terminal.

4. The method of claim 3, further comprising:
responsive to sending the updated attestation routine, receiving, by the payment server and from the payment terminal, second attestation data based on execution of the updated attestation routine; and
based at least in part on the second attestation data, sending, by the payment server, an attestation ticket to the payment terminal that enables the payment terminal to receive payment data from another device.

5. The method of claim 1, wherein the first indication is of fraud associated with the payment transaction.

6. The method of claim 1, wherein the first indication is of a tamper attempt associated with the payment transaction.

7. The method of claim 1, wherein updating the test criteria to the updated test criteria is further based at least in part on externally-updated test criteria.

8. The method of claim 1, wherein the updated test criteria comprises local test criteria and server test criteria.

9. The method of claim 1, wherein updating the test criteria to the updated test criteria is performed using machine learning techniques.

10. The method of claim 1, wherein the payment server and the payment terminal communicate via an obfuscated and encrypted protocol.

11. The method of claim 1, wherein the updated attestation routine expires after a threshold amount of time.

12. A system comprising:
one or more processors; and
one or more non-transitory computer-readable media storing instructions executable by the one or more processors, wherein the instructions cause the one or more processors to perform acts comprising:
receiving, at a payment server and from a payment terminal of a merchant, attestation data based at least in part on execution of an attestation routine comprising test criteria;
based at least in part on the attestation data and payment transaction data corresponding to a payment transaction conducted at the payment terminal, determining, by the payment server, a first indication of fraud associated with the payment transaction or a first indication of a tamper attempt associated with the payment transaction;
receiving, by the payment server, a second indication, wherein the second indication indicates an improper denial or improper acceptance of the payment transaction; and
based at least in part on the first indication and the second indication, generating, by the payment server, an updated attestation routine by updating the test criteria to updated test criteria.

13. The system of claim 12, the acts further comprising:
generating, by the payment server, the attestation routine in response to receiving an initial request from the payment terminal to attest the payment terminal; and
sending, by the payment server, the attestation routine to the payment terminal,
wherein receiving the attestation data is responsive to sending the attestation routine.

14. The system of claim 13, the acts further comprising:
after generating the updated attestation routine, receiving, by the payment server and from the payment terminal, a second request from the payment terminal to attest the payment terminal; and
responsive to receiving the second request, sending, by the payment server, the updated attestation routine to the payment terminal.

15. The system of claim 14, the acts further comprising:
responsive to sending the updated attestation routine, receiving, by the payment server and from the payment terminal, second attestation data based on execution of the updated attestation routine; and
based at least in part on the second attestation data, sending, by the payment server, an attestation ticket to the payment terminal that enables the payment terminal to receive payment data from another device.

16. The system of claim 12, wherein the updated attestation routine expires after a threshold amount of time.

17. One or more non-transitory computer-readable media storing instructions executable by one or more processors that, when executed by the one or more processors, cause the one or more processors to perform acts comprising:
receiving, at a payment server and from a payment terminal of a merchant, attestation data based at least in part on execution of an attestation routine comprising test criteria;
based at least in part on the attestation data and payment transaction data corresponding to a payment transaction, determining, by the payment server, a first indication of fraud associated with the payment transaction or a tamper attempt associated with the payment transaction;
receiving, by the payment server, a second indication, wherein the second indication indicates an improper denial or improper acceptance of the payment transaction; and
based at least in part on the first indication and the second indication, generating, by the payment server, an updated attestation routine by updating the test criteria to updated test criteria.

18. The one or more non-transitory computer-readable media of claim 17, the acts further comprising:
generating the attestation routine in response to receiving an initial request from the payment terminal to attest the payment terminal; and
sending the attestation routine to the payment terminal,
wherein receiving the attestation data is responsive to sending the attestation routine.

19. The one or more non-transitory computer-readable media of claim 18, the acts further comprising:
after generating the updated attestation routine, receiving, by the payment server and from the payment terminal, a second request from the payment terminal to attest the payment terminal; and
responsive to receiving the second request, sending, by the payment server, the updated attestation routine to the payment terminal.

20. The one or more non-transitory computer-readable media of claim 19, the acts further comprising:
responsive to sending the updated attestation routine, receiving, by the payment server and from the payment terminal, second attestation data based on execution of the updated attestation routine; and
based at least in part on the second attestation data, sending, by the payment server, an attestation ticket to the payment terminal that enables the payment terminal to receive payment data from another device.

* * * * *